July 28, 1942.    E. H. GREIBACH    2,290,875
MEASURING DIFFERENCES OF POTENTIAL
Filed June 2, 1939    6 Sheets-Sheet 1
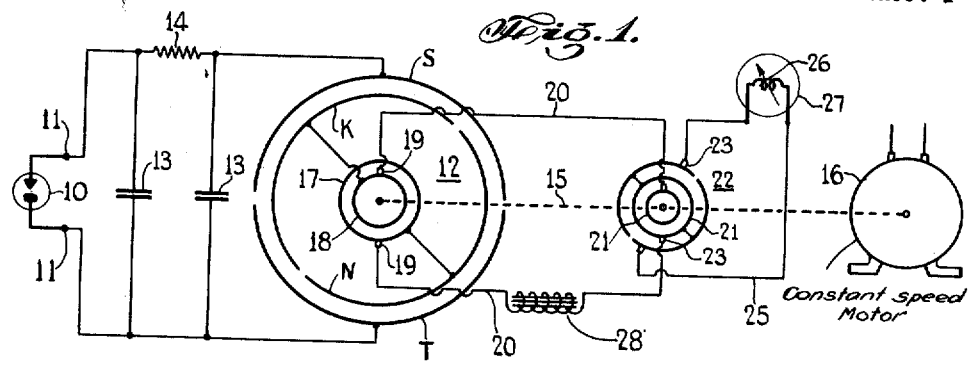
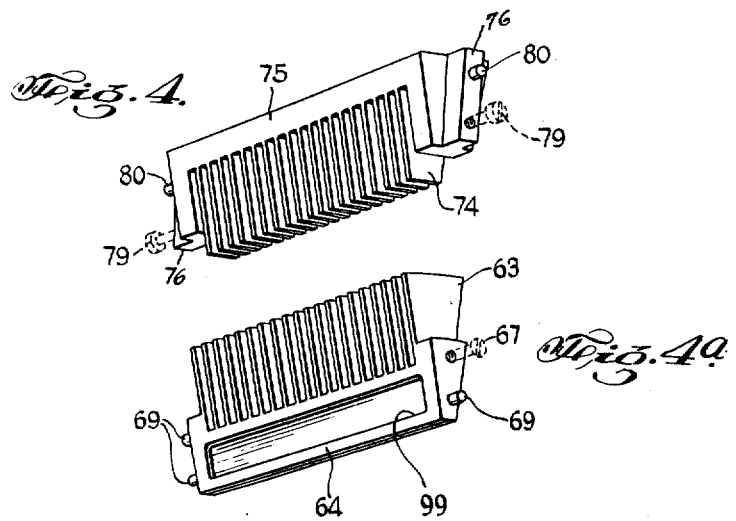
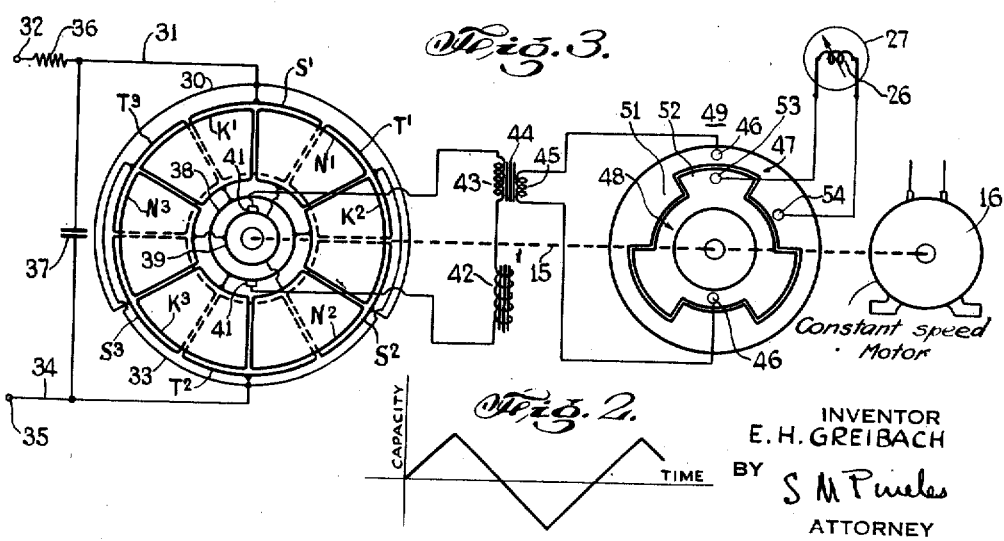
INVENTOR
E. H. GREIBACH
BY S M Pineles
ATTORNEY

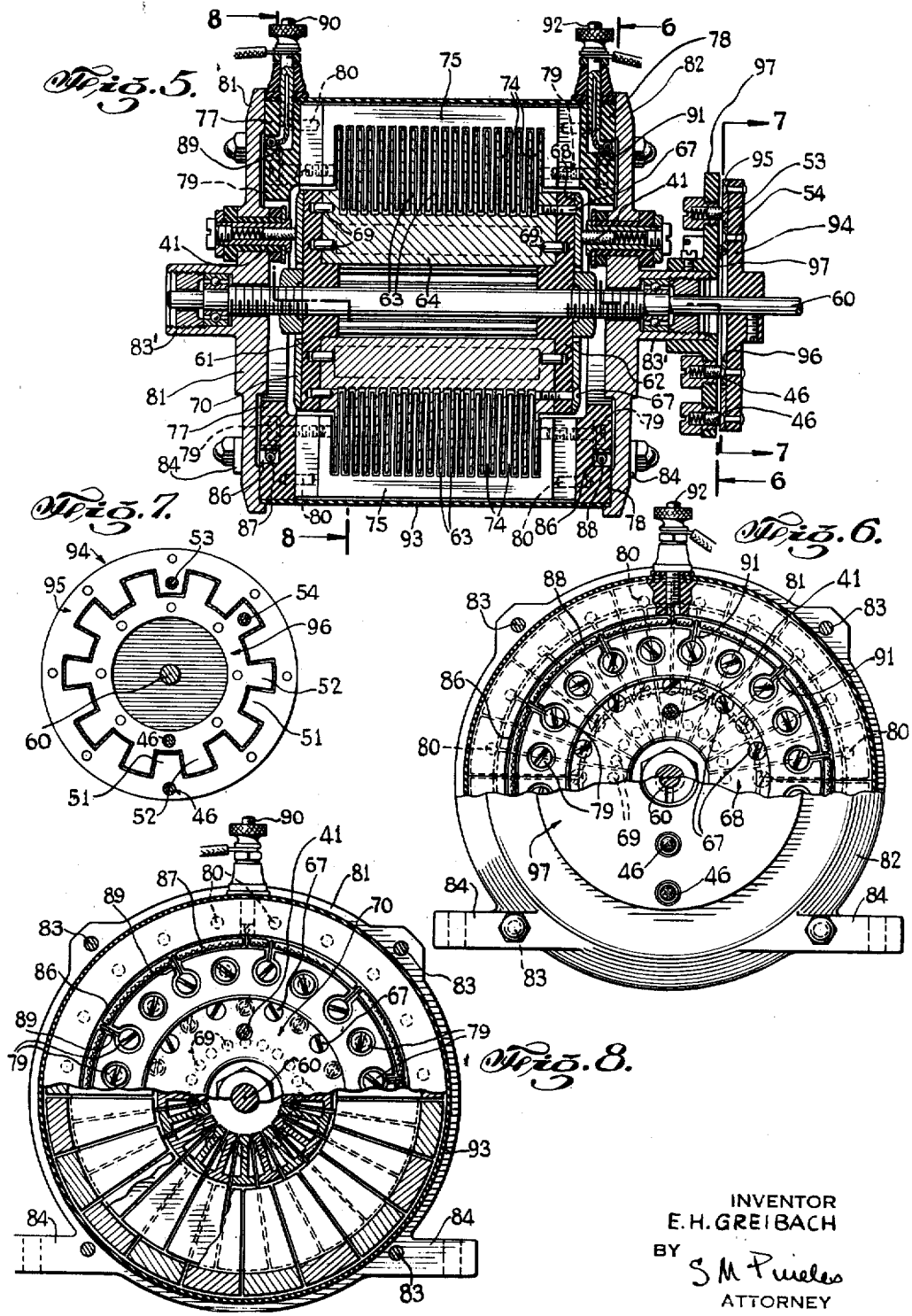

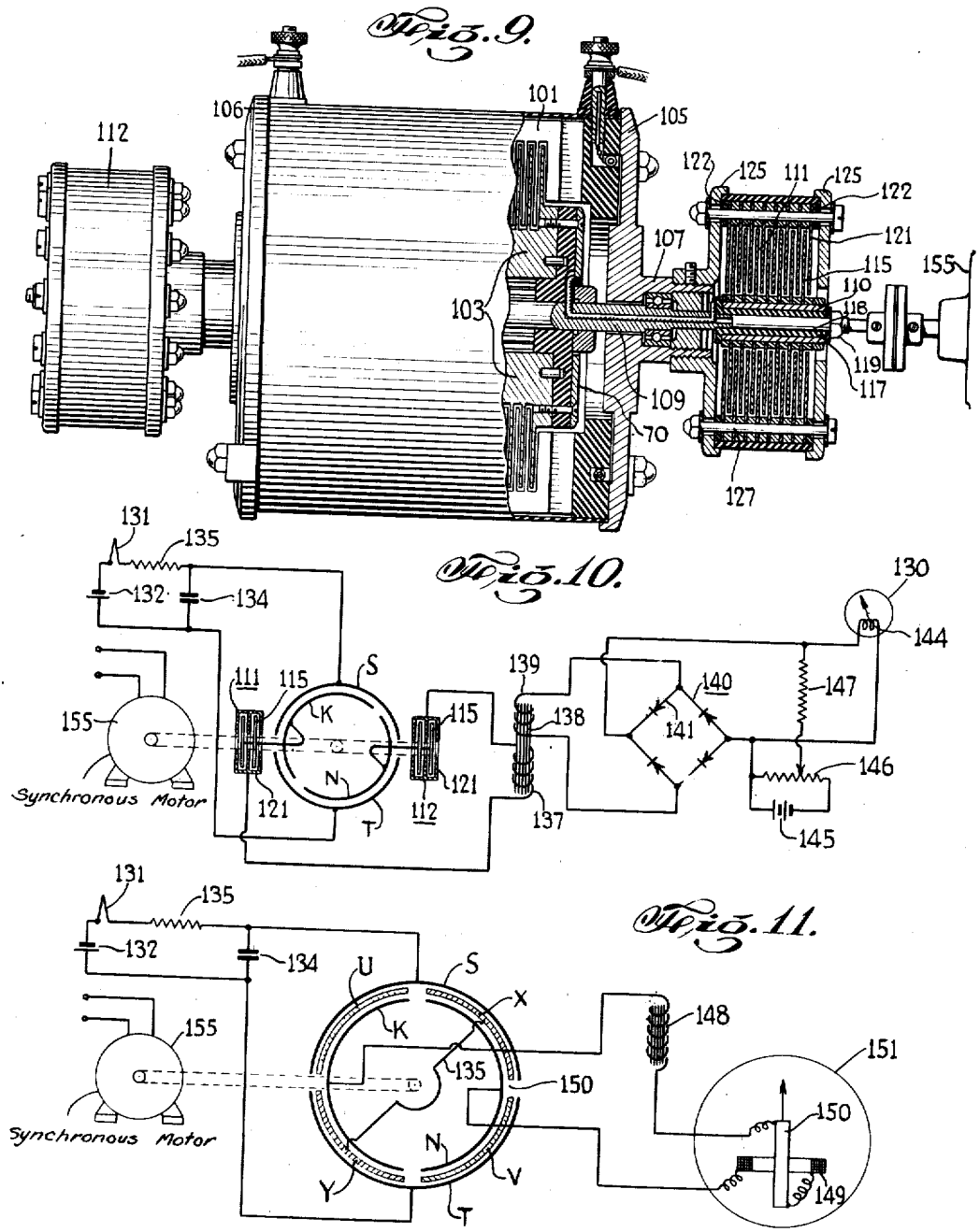

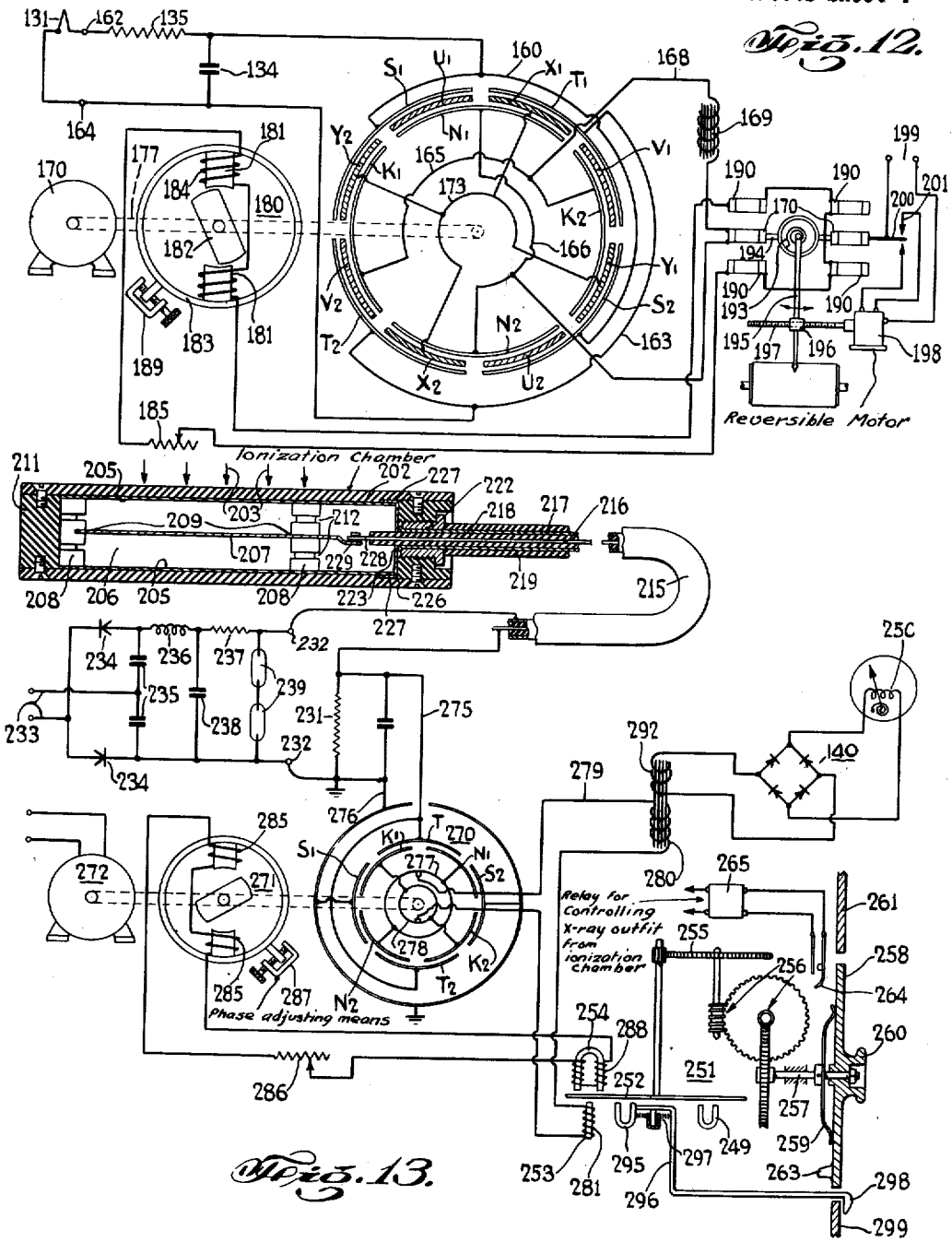

July 28, 1942.  E. H. GREIBACH  2,290,875
MEASURING DIFFERENCES OF POTENTIAL
Filed June 2, 1939  6 Sheets-Sheet 5
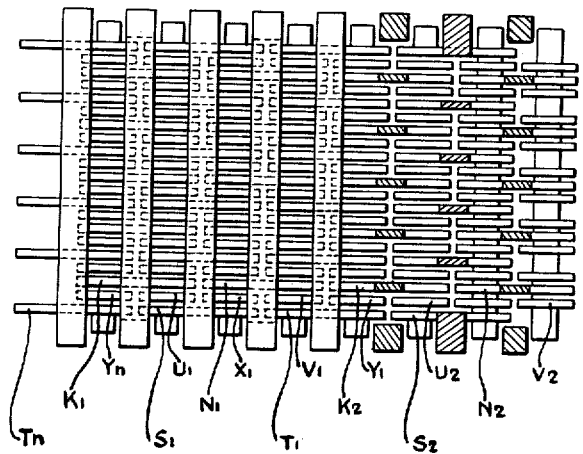
Fig. 14.
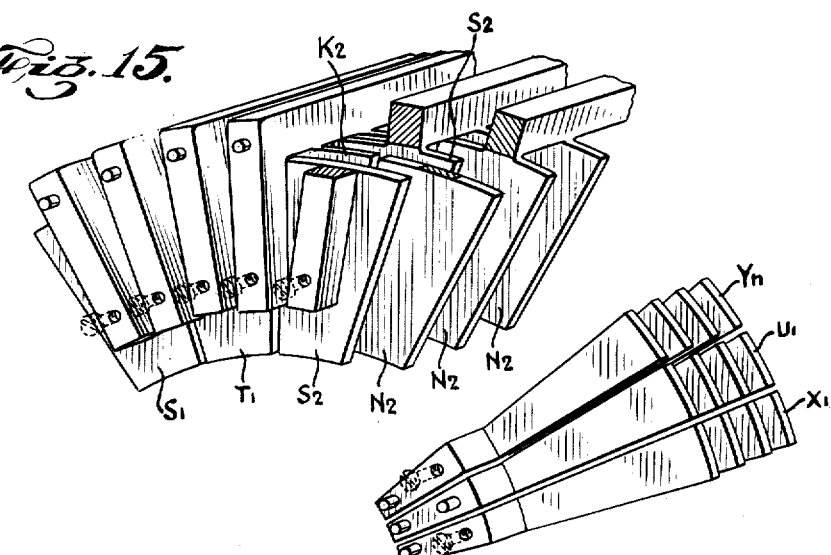
Fig. 15.
Fig. 16.
INVENTOR
E. H. GREIBACH
BY S M Pruelas
ATTORNEY July 28, 1942.  E. H. GREIBACH  2,290,875
MEASURING DIFFERENCES OF POTENTIAL
Filed June 2, 1939  6 Sheets-Sheet 6
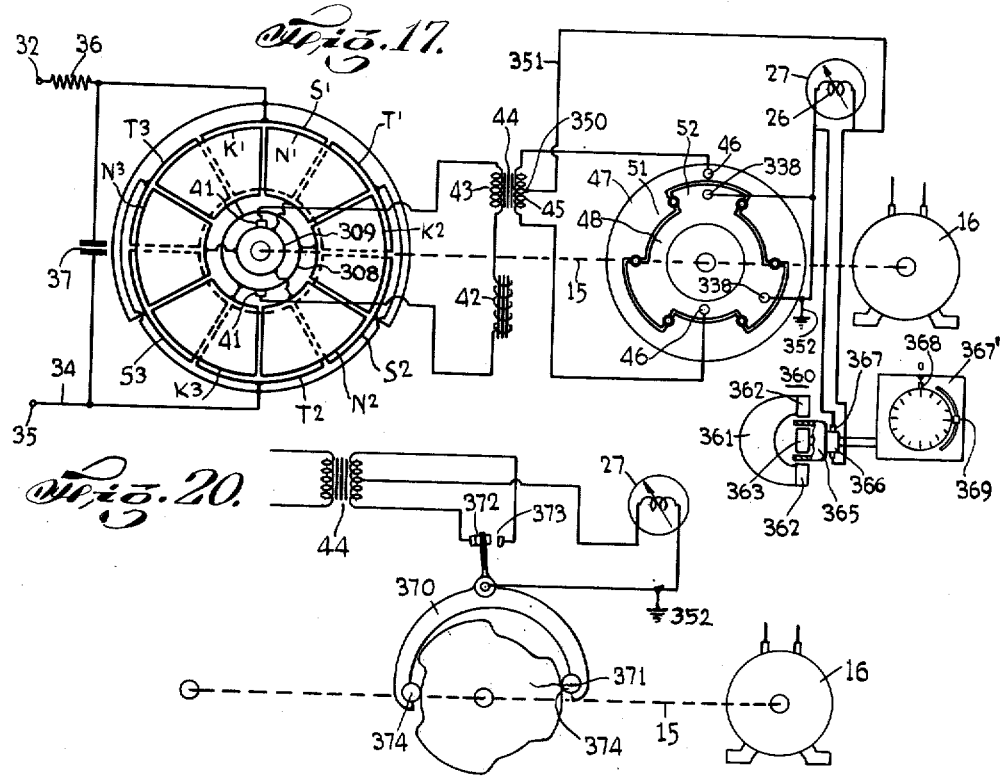
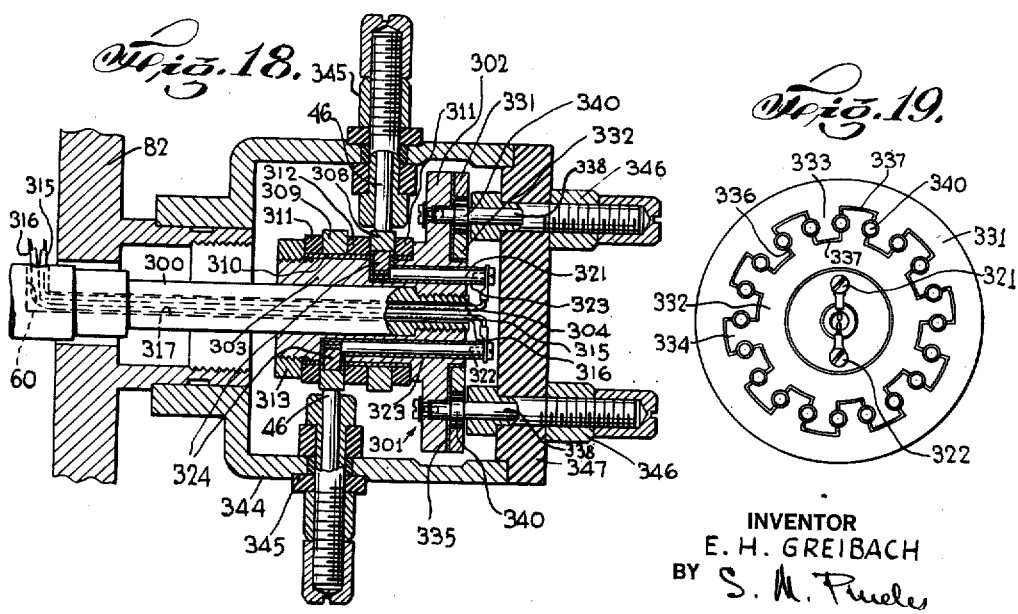
INVENTOR
E. H. GREIBACH
BY S. M. Pincles
ATTORNEY Patented July 28, 1942

2,290,875

UNITED STATES PATENT OFFICE 2,290,875

MEASURING DIFFERENCES OF POTENTIAL

Emil Henry Greibach, Brooklyn, N. Y.

Application June 2, 1939, Serial No. 277,002

38 Claims. (Cl. 171—95)

This application is a continuation-in-part of my application Serial No. 84,450, filed June 10, 1936, which application is a continuation-in-part of my application Serial No. 53,170, filed December 6, 1935, said prior applications having become abandoned.

This invention relates to improvements in measuring differences of potential and arrangements for carrying out such measurements.

There has long existed a need for direct acting instruments for direct measurement of moderate D. C. (direct current) potentials of electric sources from which no energy can be drawn without affecting the voltage of the source. The potentiometers which are used for such measurements give no direct indication and require special manipulations and readings which affect the source. Available electrostatic instruments able to indicate D. C. voltages without drawing energy from the source have very limited sensitivity and cannot be constructed for operation with less than 100 volts full scale.

In an article of A. Matthias in the magazine "Elektrizitatswirtschaft" of July 1926, pages 299-300, are described rotary condensers for measuring voltages between points of different potentials consisting of a stator having two condenser sheets connected to the source of potential to be measured and a rotor having two condenser sheets connected to a high impedance input circuit of a vacuum tube amplifier for actuating a meter in accordance with the potential difference. Only very high potential differences of many thousand volts could be measured with such rotary condensers without the use of amplifiers, but in such cases only highly sensitive D. C. instruments had to be used with the rotary condensers for the measurement. It was also believed that in using such rotary condenser measuring apparatus, they act as an infinite impedance volt-meter, and that no current flows between the potential source, the voltage of which is measured, and the rotary condenser.

I have found that when such potential source is connected to a rotary condenser, a small alternating current flows between the source and the rotary condenser, and that measuring apparatus operating with such rotary condensers are limited not only by their low sensitivity, but also by the fact that the voltage measured may be affected by the current flowing between the source and the rotary condenser. Where an amplifier has to be used for measuring low voltages, the accuracy of the measurement is greatly reduced by the many variable characteristics inherently present in an amplifier system. Accordingly, prior rotary condenser apparatus could not be used in applications where measuring instruments with infinite impedance characteristics and capable of precisely measuring D. C. potentials are needed.

I have found that a measuring arrangement of the foregoing type comprising a condenser apparatus, having inducing condenser sheets of opposite polarity connected through input leads to points of a potential source, and induced condenser sheets of opposite polarity connected to a measuring instrument circuit for inducing by rotational means arranged to cause periodical variations of the capacitive coupling between the inducing and the induced sheets current alternations required to operate the instrument, may be constructed so as to directly actuate a standard indicating or recording measuring instrument, by designing the instrument circuit so as to include an effective inductance which at the frequency of the induced current alternations has an impedance equal to the capacitive impedance between the inducing and induced segments in their position of maximum capacitive coupling, and designing the circuit elements connected between the potential source and the inducing sheets of opposite polarity so as to be effective in suppressing flow of current between the source of potential and the inducing sheets.

In the practical measuring arrangement of the invention, the periodic variations of the effective coupling between the inducing sheets and the induced sheets are produced by the relative rotational movement between the inducing and induced condenser sheets. The inducing sheets are constructed in the form of a plurality of discs subdivided into a plurality of adjacent segments of opposite polarity, and the induced sheets are constructed in the form of similar discs alternately interposed between the discs of inducing sheets.

Fig. 1 is a diagram illustrating a combination of elements constituting a measuring apparatus exemplifying the invention;

Fig. 2 is an explanatory curve diagram illustrating the operation of the apparatus;

Fig. 3 is a diagram illustrating the principles of construction of a practical rotary condenser exemplifying the invention;

Figs. 4 and 4a are perspective views of a stator section and a rotor section of the rotary condenser shown in Figs. 5 to 8;

Fig. 5 is a vertical sectional view of the rotary condenser shown diagrammatically in Fig. 3;

Fig. 6 is a vertical sectional view of the rotary condenser along lines 6—6 of Fig. 5;

Fig. 7 is a view of the commutator unit along lines 7—7 of Fig. 5;

Fig. 8 is a vertical sectional view of the rotary condenser along lines 8—8 of Fig. 5;

Fig. 9 is a view similar to Fig. 5 of a modified form of rotary condenser;

Fig. 10 is a diagram illustrating a measuring system using a rotary condenser apparatus of the construction shown in Fig. 9;

Fig. 11 is a simplified diagram of a measuring system of the invention operating with another form of rotary condenser;

Fig. 12 is a diagram of a measuring system of the invention operating with a practical rotary condenser apparatus;

Fig. 13 is a diagram illustrating an X-ray intensity measuring system utilizing rotary condenser apparatus of the invention;

Fig. 14 is a developed view of the periphery of the condenser sections of the practical construction of a condenser apparatus of the type shown diagrammatically in Fig. 12 made from stator sections shown in Fig. 15 and rotor sections shown in Fig. 16;

Fig. 15 is a perspective view of stator condenser sections of a condenser apparatus of the type shown in Figs. 12 and 14;

Fig. 16 is a perspective view of sets of rotor vane sections of a condenser apparatus of the type shown in Figs. 12 and 14;

Fig. 17 is a diagrammatic view similar to Fig. 3 illustrating a rotary condenser measuring arrangement with a different type of rectifying commutator arrangement and a different type of recording instrument;

Fig. 18 is a cross-sectional view through the commutator arrangement of Fig. 17;

Fig. 19 is an end view of the commutator shown in Fig. 18; and

Fig. 20 is a view similar to Fig. 17 illustrating a switching commutator arrangement for rectifying the rotor currents which are delivered to the measuring instrument.

As shown in Fig. 1, a source of direct current potential, such as an electrolytic cell 10, the potential E of which is to be measured, has its electrodes connected to two terminals 11 leading to two condenser segments S, T of a rotary condenser 12. The input circuit to the condenser segments S, T is provided with a filter including a shunting impedance formed of two condensers 13 and a series impedance formed of resistor 14, and applies to the stator segments S and T the potentials of the electrodes of cell 10.

The condenser segments S and T form a stator and cooperate with two similarly shaped coextensive condenser segments K, N of a rotor that is rotated by a shaft 15 (indicated in dotted lines) that is driven by a constant speed motor 16. Charges induced on the rotor are led over rotor slip rings 17, 18, brushes 19 and leads 20 to slip rings 21 of a rectifying commutator 22 mounted on the shaft 15 for supplying through its brushes 23 input leads 25 of a meter element 26 which operates a meter 27, an inductance 28 being included in an output lead 29 from the rotor segments K, N.

The rotor segments K and N are rotated relatively to the stator segments S, T at a periodic rate determined by the speed of the motor 16 and acquire charges induced by the potentials applied to the stator segments S and T proportional to the capacity formed by the oppositely lying rotor and stator segments. Thus, with the stator sheet S connected, for instance, to the positive potential and stator segment T to the negative potential of the source 10, the rotor segment K will have its maximum negative charge when it is aligned with a stator segment S and forms with it a condenser of a capacity $C_0$. After a rotation of 180°, K lies in the same relative position opposite segment T and forms with it a condenser of the same capacity $C_0$, but has a positive charge because of the negative charge of T.

I have found that the effect of these capacity pulsations of the two rotor segments K, N on the circuit connected between these segments may be represented by the capacity-time curve of Fig. 2, alternating at periodic intervals (indicated as abscissae) between $+C_0$ and $-C_0$ (indicated as ordinates), and passing through zero when the rotor segments are in quadrature relation to the stator segments; and that with a voltage E applied to the stator segments, these capacity alternations produce in the rotor circuit a periodic current $I_r$ containing a fundamental component of the frequency of the capacity alternations and harmonic components of odd multiples of the fundamental frequency given by equation $$I_r = \frac{4E}{\pi}\left[\frac{\cos(\omega t-\phi_1)}{\sqrt{R^2+\left(\omega L-\frac{2}{\omega C_0}\right)^2}}+\frac{1}{3^2}\frac{\cos(3\omega t-\phi_1)}{\sqrt{R^2+\left(3\omega L-\frac{2}{\omega C_0}\right)^2}}+\cdots\frac{1}{n^2}\frac{\cos(n\omega t-\phi_n)}{\sqrt{R^2+\left(n\omega L-\frac{2}{\omega C_0}\right)^2}}\right] \quad (1)$$

wherein
R is the total resistance of the rotor circuit
L is the total inductance of the rotor circuit
n are positive odd integer numbers
$\phi_n$ = arc tang $$\frac{nL-\frac{2}{nC_0}}{R}$$

is the phase angle of the harmonic currents, and
$\omega = 2\pi f$

This equation shows that under the action of the charges applied to the stator segments, the segments of the rotary condenser, which act as a fixed capacity ½ $C_0$ in series with the rotor circuit, are subjected to a complex alternating voltage proportional to the stator voltage E. This effect makes it possible to produce in the rotor circuit a large current of the fundamental or of an odd harmonic frequency by proportioning the total inductance of the rotor circuit in accordance with the equation $$L = \frac{2}{n^2\omega^2 C_0} \quad (2)$$

while keeping the resistance of the rotor circuit at a minimum value.

The foregoing equations show that a large measuring current may be produced in the meter circuit by including in the instrument circuit connected to the induced condenser segments an inductance which establishes a resonance condition with the condenser segments aligned in the position in which maximum capacitive coupling is established between the inducing condenser segments of the stator and the induced condenser segments of the rotor.

This inductance is held down to a relatively low value required to reduce the resistance of the instrument circuit by designing the condenser apparatus with a relatively large number of condenser segments stacked to provide a relatively large capacity, and the speed of the relative rotation between the induced and inducing condenser sections is made relatively high so as to produce a measuring current of relatively high frequency.

To this end the rotary condenser apparatus of the invention is constructed in accordance with the principles shown diagrammatically in Fig. 3. It has a stator provided with a set of alike stator plate segments $S_1$, $T_1$, $S_2$, $T_2$, $S_3$, $T_3$ of alternate polarity which form annular discs subdivided by small gaps so that adjacent segments of opposite polarity are insulated from each other. The segments $S_1$, $S_2$, $S_3$ of one polarity are interconnected by a conductor 30 which is connected through a lead 31 to one input terminal 32 of the apparatus. The segments $T_1$, $T_2$, $T_3$ of opposite polarity are similarly interconnected by a conductor 33 which is connected through a lead 34 to the other input terminal 35. A resistor 36 connected in the terminal lead 31 and a condenser 37 connected parallel to the stator halves of opposite polarity constitute a filter for the input circuit. The rotor is provided with a similar set of insulated segments $K_1$, $N_1$, $K_2$, $N_2$, $K_3$, $N_3$ of alternate polarity forming discs spaced by a small air gap from the discs formed by the stator segments $S_1$ to $T_3$. The rotor segments $K_1$, $K_2$, $K_3$ of one polarity are all connected to a slip ring 38 and the rotor segments $N_1$, $N_2$, $N_3$ of opposite polarity are connected to a slip ring 39. The rotor with its rotor segments $K_1$, $N_1$, etc. is rotated by motor 16 at a constant speed as in Fig. 1.

The two rotor slip rings 38, 39 are connected through brushes 41 to a rotor circuit including an inductance in the form of a choke coil 42 and the primary winding 43 of a step-down transformer 44 having a secondary winding 45 leading to two brushes 46 engaging slip ring portions 47, 48, of a rectifying commutator 49 which is rotated by the shaft 15 in synchronism with the condenser rotor. The slip ring portions of the commutator have three interleaved commutator segments 51, 52, which come alternately into engagement with commutator brushes 53, 54 leading to the actuating element 26 of a measuring instrument 27, as in the apparatus of Fig. 1.

With this arrangement each rotor segment of one polarity moves past a large number of pairs of stator segments of opposite polarity during a single revolution of the shaft 15. The frequency of the capacity alternations and the induced alternate charges is correspondingly increased. Accordingly, the fundamental frequency of the current in the rotor circuit leading through the primary winding of the transformer 45 and the choke coil 44 will be equal to the number of revolutions per second of the rotor times the number of segment pairs in a single disc of condenser segments. The step-down transformer 44 supplies correspondingly larger alternating currents which are rectified by the commutator 49 and supplied to the measuring instrument 27. To secure proper rectification, the commutator brushes 53, 54 are mounted on an adjustable support so as to bring the commutating action in phase with the current alternations in the rotor circuit.

By making rotary condensers with a large number of segment pairs per disc arranged in the way explained in connection with Fig. 3, the frequency of the fundamental current alternations in the rotor circuit can be greatly increased. This frequency should preferably be at least 400 cycles per second. Such subdivision of the discs into a plurality of segment pairs does not decrease the effective capacity between adjacent stator and rotor discs, except for the negligible area loss at the radial gaps between the adjacent segments of opposite polarity. A large effective capacity essential for reducing the required rotor inductance may be obtained by assembling sets of stator and rotor discs into stator and rotor stacks with the discs of one set interleaved between the discs of the other set. Such rotor and stator stacks may be constructed by mounting the disc segments on suitable supports which hold the segments of opposite polarity insulated from each other while interconnecting all segments of the same polarity. The segments of one disc may, for instance, be mounted on a single insulating support by molding foil segments into a still layer of insulating material, or peripheral sets of segments of the same polarity constituting parts of different discs may be supported on common yokes of conducting material that are mounted on insulating supports, as described hereinafter. The maximum capacity between the inducing and the induced sheets should preferably be at least $5 \times 10^{-10}$ farad.

Such rotary condenser consisting of twenty stator and rotor discs having an outer diameter of about 6 inches will have an effective capacity of 3,000 m. m. f. (micro-microfarads) for each polarity; by subdividing each stator and rotor disc into ten pairs of segments, the frequency of the rotor currents produced with a standard 60-cycle two-pole synchronous motor is multiplied ten times giving a fundamental frequency of alternations of 600 cycles per second. By providing the rotor circuit of such rotary condenser with a series inductance of only about 46 henries having an inherent resistance of about 10,000 ohms, a voltage of 1 volt applied to the stator terminals will produce a 600-cycle rotor current of $100 \times 10^{-6}$ amps. which will produce a full scale deflection in a meter of ordinary sensitivity. By using in the rotor circuit inductance coils with lower resistance and meters of higher sensitivity, this rotary condenser apparatus will give direct measurements of small D. C. voltages with the degree of sensitivity heretofore possible only with potentiometers. For operating meters of low sensitivity, the sensitivity of the apparatus may be considerably increased by using a step-down transformer in series with the inductance coil as shown in Fig. 3.

The rotary condenser apparatus of the invention may be operated with other types of rectifiers for actuating D. C. indicating instruments, and may also be used without commutators or other rectifiers by supplying the rotor current directly or through a transformer to an alternating meter which is actuated by a thermo-couple.

In addition to the currents flowing through the meter circuit described above, the voltage across the rotor segments also produces a current through the shunt formed by the fixed capacity between the adjacent rotor segments of opposite polarity. It can be shown that the meter circuit with this shunt capacity is equivalent to a simple series meter circuit without the shunt capacity in which the effective inductance and the effective resistance are somewhat larger than the actual inductance and resistance in the meter circuit and that the performance of the apparatus is not materially affected by this shunt capacity. However, this shunt capacity may be materially reduced by providing longitudinal cavities 89 on the opposite sides of the yoke of each rotor segment as shown in Fig. 4a, or by making the yoke portions of insulating material.

The full effectiveness of the rotary condenser apparatus as an infinite impedance measuring device is secured by the use of the shunt and series filter elements 13, 14 in Fig. 1, and 36, 37 in Fig. 3, associated with the input circuit to the rotary condenser for preventing current flow between the stator and the source of potential, the voltage of which is measured. I have found that the voltages between the rotor segments produced by the currents flowing in the rotor circuit react on the stator segments of opposite polarity and produce complex stator currents between the stator segments and the voltage source. These complex stator currents consist of alternating currents comprising a predominant fundamental component of twice the frequency and about one-quarter of the amplitude of the fundamental rotor current and the higher harmonics of the said fundamental component, and may be represented by an equation similar to Equation 1.

Although these stator currents are relatively small, they would destroy the effectiveness of the measuring apparatus as an infinite impedance measuring device, because such infinite impedance measuring device must have a D. C. resistance of at least $10^8$ ohms. By using filter elements in the input circuit to the rotary condenser in the way shown in Figs. 1 and 3, the measuring apparatus is given the desired infinite impedance characteristics. The shunting condensers 13, 37, have a capacity about five to ten times the maximum capacity $C_0$ between the inducing and induced segments, and provide a very low A. C. impedance and a very high D. C. impedance across the inducing segments. As a result, the A. C. voltage drop across the shunting condenser is very small and the A. C. currents between the inducing segments and the potential source are negligible. The ohmic series resistors 14, 36 of several megohms connected in the input leads, give a total input circuit resistance of the order of $10^{11}$ ohms, which is a multiple of the impedance across the condenser sheets at the frequency of the stator currents, and substantially completely suppress currents between the potential source and the stator segments.

In Figs. 5 to 8 is shown the actual construction of a rotary condenser based on the principles of the invention explained in connection with Fig. 3. The rotor has a shaft 60 to which are secured two supporting rings 61, 62 of insulating material that support twenty annularly disposed condenser segment sections of a light material, such as aluminum, arranged in a way similar to the rotor segment sections $K_1$, $N_1$ to $K_3$, $N_3$ in Fig. 3.

As shown in the perspective view of Fig. 4a, each rotor section has twenty outwardly projecting transverse plate segments 63 extending from a longitudinal yoke 64 provided on its opposite ends with end blocks abutting against the insulating rings 61, 62. The yoke of each rotor segment section of one polarity has one end fastened to the supporting plate 62 by means of a screw 67 extending through the supporting plate 62 and clamping to its outer face a slip ring 68 of one polarity, a dowel pin extending below the screw, and two similar dowel pins 69 on the other end of its yoke keep the segment section fixed in place.

In a similar way the yoke 64 of each rotor segment section of opposite polarity has its opposite end fastened by a screw 67 to supporting ring 61 and a slip ring 70 of opposite polarity, dowel pins extending from the ends of the yoke serving as an additional support. Thus, all alternate rotor segments of each rotor disc of one polarity are connected to a slip ring 68 and all the intermediate rotor segments of opposite polarity are connected to the other slip ring 70.

The stator has twenty annularly disposed condenser segment sections shown in detail in Fig. 4 arranged in a way similar to the stator segment sections $S_1$, $T_1$ to $S_3$, $T_3$ in Fig. 3. Each stator section has nineteen inwardly projecting transverse plate segments 74 extending from a longitudinal yoke 75 provided on its opposite ends with narrow end blocks 76 abutting against semi-annular insulating plates 77, 78 on the opposite ends of the stator which are clamped to the end blocks 76 by screws 79 having screw heads located in cavities on the outer faces of the plates and by two additional dowel pins 80. The two stator halves so formed, each consisting of five pairs of condenser sections of opposite polarity, are assembled into a unit with the rotor by means of end plates 81, 82 which are held in place by long screws 83. The end plates 81, 82 are provided with bearing housings 83' holding the ball bearings on which the rotor shaft 60 runs, and have supporting legs 84 for mounting the condenser unit.

The insulating supporting plates 77 and 78 on the opposite sides of the stator sections are provided on their outer sides with annular grooves 86 in which are located connector wires 87 and 88. The connector wire 87 is connected through jumpers 89 with screws leading to alternate segments of the stator to provide interconnections between these segments of one polarity and a terminal post 90 connected to the connector wire 87. In a similar way the other connector wire 88 is connected through jumpers 91 to the set of alternate segments of opposite polarity and a terminal post 92 connected to the connector wire 88. Connections to the two rotor slip rings are made by means of brushes 41 mounted in insulating cartridges within the opposite stator end plates 81, 82. The assembled stator and rotor elements are enclosed by a cylindrical metallic sheet 93 held clamped between the end plates. The metallic sheet 93 enclosing the rotary condenser is made of relatively heavy material so that it not only serves as an effective electrostatic shield against external inducing fields, but also in order to insulate the exterior against the wind noise generated by the rotation of the rotor vanes between the stator vanes.

On an insulating annular supporting plate 94 clamped to the shaft at one end of the condenser unit are mounted two sections 95, 96 of a multi-segment commutator arranged in the way shown in Fig. 7. The interfitting segments of the commutator sections 95, 96 correspond to the segments of the rotor and rectify the rotor current in the way explained in connection with Fig. 3.

To support the brushes and permit adjustment of their phase relation, a brush support 97 is mounted rotatably on the outer end of the bearing housing of the end plate 82. On this brush support are mounted the two brushes 46 which engage the slip ring sections of the commutator segments and two brushes 53 and 54 which engage commutator segments of opposite polarity.

The cylindrical sheet 93 which encloses the stator may comprise an inner layer of insulating material and an outer layer of conducting material which by reason of its capacity relation with the condenser sections of opposite polarity constitutes a part of the filter capacity connected parallel to the stator segments.

The conducting parts of the stator are so mounted on the insulating supports as to provide long leakage paths between condenser elements of opposite polarity, and insulating material of good insulating properties and small surface leakage is used for these insulating supports.

In the construction of practical rotary condenser apparatus of the type described above in connection with Figs. 3 to 8, it is very important to assure a very high stator input resistance, and in most applications of such rotary condenser apparatus, it is desirable that the leakage resistance between the inducing segments of opposite polarity which forms a stator should be at least $10^{10}$ ohms. It is further very important that the high leakage resistance should not materially decrease even at 100% humidity conditions.

I have found that in the practical construction of rotary condensers of the type shown in Figs. 5 to 8, materials of the type known commercially as hard rubber are about the best insulating material available at present for the stator segments. However, although such hard rubber material has the required high volume or internal resistance, its surface leakage resistance decreases with the rise of humidity. I have found that the surface resistance of hard rubber may be made substantially independent of changes in humidity by first cleaning the surface of the hard rubber with a fine sandpaper or buffer, and then rubbing in the surfaces with a low leakage wax or paraffin substances which are known to have a very high leakage resistance. In applying such treatment to the surface of the insulating support, the wax substance is rubbed into the surface until only a very thin film of wax remains on the surface. Such wax coating may be also applied to the surface of the insulating support by impregnating the insulating support with a liquified wax, preferably under suitable vacuum conditions.

Care must also be taken that all parts of the rotary condenser apparatus and the measuring arrangement connected thereto should be shielded by enclosure means of good conductive material, such as metal, which is connected to a good ground.

I have found that in the practical constructions of rotary condenser measuring arrangements of the type shown in Figs. 3 to 8, operating with an induced 600 cycle voltage, the tuning inductance 42 required to obtain a large output current for operating a standard panel-type measuring instrument 27 may be constructed so that the output circuit connected to the induced condenser sections has a ratio of the inductive impedance to the resistance, or a Q, of about 60. To obtain maximum power output, a matching transformer 44 is used which is designed to reflect into the tuned circuit the resistance of the meter circuit so that it is equal to the resistance of the tuned circuit. This reduces the Q of the induced or rotor circuit to about 30.

Since small variations in the frequency of the power supply from which the synchronous driving motor is energized will result in small fluctuations of the generated frequency, sharper tuning or higher Q of the rotor circuit might produce undesirable fluctuations of the induced meter current. By keeping the effective Q of the rotor circuit at about 30, such fluctuations of the induced measuring current may be kept to less than 1% essential for satisfactory measuring instruments.

The Q of the tuned induced or rotor circuit might also be affected by an excessive leakage resistance across the induced or rotor segments. Thus, a leakage resistance of $10^8$ ohms would reduce the Q by about 1%. It is accordingly important to keep the leakage resistance across the induced or rotor segments larger than about $10^8$ ohms.

The matching or coupling transformer 43 is also of importance in electrically insulating the induced rotor circuit from the meter circuit. By this arrangement, the leakage or capacitive coupling of the long leads of the circuit to the meter instrument will have only a negligible effect on the rotor circuit. To minimize this effect, the leakage resistance between the primary and secondary winding of the matching transformer is made large, and, in addition, the capacitive coupling between the primary and secondary winding of the matching transformer is made as small as possible.

The principles of the invention described hereinabove will suggest many other ways for utilizing the substantial output current by including in the output circuit of such condenser apparatus sufficient inductance for producing a condition of resonance in the circuit, that is for producing with the output current a reactive voltage drop comparable in magnitude with the alternating voltage induced by the rotary movement of one condenser section relative to the other.

In a similar way large currents of the higher harmonics of the fundamental component may be produced by including in the output circuit an inductance proportioned to produce at the desired harmonic frequency a reactive voltage drop of the order of the harmonic voltage induced by the rotary condenser action.

By making the reactive voltage equal in magnitude to the alternating voltage induced by the rotary movement, a substantial amount of energy correlated in magnitude to the voltage applied to the inducing condenser sections may be delivered to an output load supplied by the induced condenser sections. Automatic compensation for small departures from the constant rotor speed may be obtained by using in the output circuit an inductance somewhat larger than required for securing the maximum output current.

By choice of suitable transformer ratios or other suitable coupling means, the inductive output circuit of the apparatus may be matched with the characteristics of the device operated by the output energy.

Instead of using rotary condensers having slip rings and brushes for connecting the induced rotor segments of opposite polarity to the output circuit including the measuring instrument, coupling condensers may be used for connecting the induced segments of opposite polarity into the output circuit. Fig. 9 illustrates an embodiment of the invention exemplifying a rotary condenser with such coupling condensers.

As in the device of Fig. 5, assemblies of stator segments 101 and rotor segments 103 of opposite polarity are mounted to rotate relatively to each other within a housing having end plates 105, 106, which are provided with bearing housings 107 for journaling the rotor shaft 109 that is driven at a constant high speed to induce the high frequency charge alternations in the rotor segments. Mounted axially on the opposite ends of the rotor shaft are two coupling condensers 111 and 112, which provide coupling connections to the two sets of induced rotor condenser segments of opposite polarity.

As shown in Fig. 9, each coupling condenser comprises a rotor unit having a plurality of annular condenser discs 115, supported by an annular sleeve 116, which is mounted on an insulating sleeve 117 secured to an extension 118 of the rotor shaft 109, by a nut 119 holding the annular rotor discs firmly in place. The condenser discs 115 of the rotor unit cooperate with a stator unit having a set of similar annular stator discs 121 supported between insulating rings 122 by the end plates 125 which are held clamped by the bolts 127 that are insulated from the end plates. The inner end plate 125 has a collar which is threadedly fitted over and clamped to the outward extension of the bearing housing 107 so as to support the stator condenser discs 121 concentrically with and between the rotor disc 115.

Fig. 10 is a simplified diagram of a meter system of the invention utilizing such rotary condenser apparatus with coupling condensers of the type shown in Fig. 9. The rotor units 115 and the stator units 121 of each of the two coupling condensers 111 and 112 serve as coupling capacitors of constant capacity connected in series with the induced sets of condenser rotary segments K, N of opposite polarity for completing a circuit to a standard meter 130, in a way similar to the exemplifications of the invention illustrated in Figs. 1 and 3.

With such arrangement, a large rotor current sufficient for supplying the meter will be obtained by including in the rotor circuit connected to the coupling capacitors an inductance tuned to resonance with the resultant effective capacity represented by serially connected sets of the rotary condenser segments, which are shunted by the inherent capacity between the two sets of rotor segments and the two serially connected coupling capacitors.

Although the resultant effective rotor capacity obtained by using coupling capacitors for completing the rotor circuit is smaller than the effective capacity in a circuit completed by brushes and slip rings, the use of the coupling capacitors is advantageous because it eliminates the brushes and the brush contact, and also because it reduces the effect of the shunting capacity between the rotor segments which increases the effective resistance of the meter circuit.

In using coupling condensers with rotary condensers of the type described in Figs. 5 to 8, favorable operating conditions and the required large meter current may be obtained by making the capacity of each of the two coupling condensers of a capacity equal to about the capacity $C_0$ referred to before.

Fig. 10 also illustrates a special embodiment of a measuring system of the invention for obtaining increased sensitivity in cases where the voltage source that is to be measured is very small, or in cases where the meter requires a large operating current, or in cases where both of these requirements are to be met. Such conditions arise, for instance, if the voltage of a thermocouple, which serves as a pyrometer, is to be measured and where the measuring instrument is of a type using a rectifier, such as a copper oxide rectifier, which has high resistance at low current densities.

In accordance with the invention, the sensitivity of the measuring system is increased by connecting in series with the small source of voltage to be measured one or more standard cells which have a constant electromotive force, such as a Weston normal cell or a Clark standard cell. Since the power delivered by the induced segments of the rotary condenser is proportional to the square of the voltage applied across the inducing condenser segments, the use of a standard cell enables a substantial increase of the power output in the induced meter circuit connected to the rotor segments and thus makes available more power for operating the meter.

As shown in Fig. 10, a pyrometer thermocouple 131 is connected in series with a standard cell 132 in a meter input circuit connected to the inducing sets of stator segments S, T of opposite polarity. The input circuit to the condenser segments is provided with a filter including a condenser 134 and a series resistor 135 designed to suppress flow of current between the thermocouple 131 and the circuit to the stator segments S and T. The induced rotor segments K, N of the rotary condenser are connected through coupling condensers 111 and 112 to an output circuit including the primary winding 137 of a step-down transformer 138 having a secondary winding 139 connected through a rectifier bridge 140 with four copper oxide rectifier elements 141 to the actuating coil 144 of the meter 130. The transformer 138 is designed to have a large leakage inductance required for tuning the circuit connected to the rotor segments K and N to a condition at which the capacitive impedance of the circuit including the serially connected coupling condensers 111 and 112 and the sets of aligned condenser segments K, N, S and T is substantially equal to the reactive impedance of the inductance in the circuit at the frequency of the alternations induced by the rotation of the rotor segments relatively to the stator segments. By making the rotary condenser with a large number of annular segments per disc and with a large number of disc segments in the way described above, a relatively small rotary condenser unit with relatively small coupling capacitors will produce with a relatively small transformer 138 the required current for actuating a standard D. C. meter supplied through a copper oxide full wave rectifier in the way shown in Fig. 10.

The use of the standard cell in series with the voltage to be measured is of great importance in connection with copper oxide rectifier meters because such rectifiers have a large resistance at low current densities, which decreases rapidly to a small value for large current densities. The voltage of the standard cell induces in the induced condenser segments a substantial voltage sufficient to send through the tuned meter circuit, including the copper oxide rectifier, a sufficiently large current to reduce the rectifier resistance to a conveniently low value. As a result, the small voltage that is to be measured is able to produce in the low resistance meter circuit, prepared by the current induced by the standard cell voltage, a relatively large current which is sufficient to actuate by itself a standard meter.

In order to utilize the full available scale of the meter, the initial indication on the meter 130, due to the voltage applied by the standard cell 132, may be suppressed by connecting to the meter an auxiliary bucking circuit consisting, for instance, of a battery 145, connected to a potentiometer 146, a portion of which is connected through a resistor 147 parallel to the meter to divert from the meter the initial current induced by the standard cell 132. Instead of using an auxiliary potentiometer circuit for suppressing the initial indication that would be produced by the instrument 130 under the action of the current induced by standard cell, the initial indication may be suppressed by giving the movement spring an initial torque equal and opposite to the torque produced in the movement by the current due to the cell. A large current thus flows through the copper oxide rectifiers 141 of the meter circuit reducing its resistance without producing an indication of the meter and the meter is able to indicate over its full scale the current produced by the additional D. C. voltage due to the action of the thermocouple 131 connected in series with the standard cell 132.

A rotary condenser apparatus operating in accordance with the principles of the invention, described in connection with Figs. 1 to 10, may also be made with stationary inducing and induced segments, by rotating relatively to such stationary segments a set of metallic segmental vanes through the spaces between the oppositely disposed induced and inducing segments for producing periodical pulsating variations of the effective capacity between opposing inducing and induced condenser segments, and thus inducing charge pulsations, which are similar in effect to the charge alternations generated by the apparatus of Figs. 1 to 10.

The principles underlying such rotary condenser will be explained by reference to Fig. 11, which illustrates in a simplified way the operative combination of the elements of a measuring apparatus utilizing such rotary condenser. A source of direct current potential to be measured, such as a pyrometer thermocouple 131, is connected in series with a standard cell 132 to stationary inducing condenser segments S, T of opposite polarity similar to the stator segments of the prior rotary condenser constructions, a filter including a condenser 134 and a resistor 135 completing the circuit. The stationary inducing segments S, T cooperate with a set of similarly shaped stationary induced condenser segments K, N mounted in quadrature relation adjacent the inducing segments and spaced therefrom by a gap 150.

Mounted for rotary movement in the gaps between the inducing and induced segments S, T, K, N, is a set of insulated rotary vanes U, V, X, Y, having an angular width equal to half of the angular width of the induced and inducing segments between which they move, and driven by a constant speed motor 155, such as a synchronous motor.

Every second vane X, Y, of each consecutive vane pair acts as a shielding vane and is interconnected with the other shielding vanes by the interconnection 135. Each shielding vane X, Y, shields the adjacent portion of the induced segments against the opposite inducing segment so that no charge is induced in the induced segment portions facing the shielding vane. Every second vane U, V, acts as a coupling vane and is insulated from all other vanes and by decreasing the gap between the induced segment and the adjacent inducing segment establishes a capacitive coupling, whereby the adjacent inducing segment induces a substantial charge on the adjacent induced segment portion.

As in the prior meter systems, the induced segments K and N are connected to a meter circuit including, for instance, an inductance 148 and two serially connected coils 149, 150 of a dynamometer measuring instrument 151.

As the rotor vanes U, V, X, Y, are rotated they produce variations of the capacity between the induced and inducing segments. As a result, the inducing segments S, T, which are maintained at the potential difference to be measured, induce in the induced condenser segments K, N, periodic alternating charges which produce in the meter circuit a measuring current similar to the rotary condenser apparatus of Fig. 1 to 10.

Thus with the vanes in the positions shown in Fig. 11, one-half of the induced segment K is coupled by vane U to the inducing segment S of positive polarity, while its other half is shielded from the negative inducing segment T by the shielding vane Y, effecting the maximum capacitive coupling of the induced segment K with the positive inducing segment S. As the rotor vanes move 45 electrical degrees in clockwise direction, for instance, one-quarter of the induced segment K is coupled by one-half of vane U to the positive inducing segment S and another quarter of the induced segment K is coupled by one-half of vane V to the negative inducing segment T, while the intermediate half of the induced segment K is shielded by vane Y, and the effective capacitive coupling of the induced segment K with the inducing segments S, T is zero. As the rotor vanes move an additional 45 degrees, one-half of the induced segment K is now coupled by vane V with the negative inducing segment, while its other half is shielded against the positive inducing segment S by the shielding vane Y, reaching a maximum capacitive coupling with the negative inducing segment T.

By the further rotation of rotor vanes through 90 electrical degrees, the coupling of the induced segment K to the negative inducing segment is brought again to zero and its capacitive coupling to positive inducing segment is made a maximum by the coupling vane V which moved into the position of vane U, thus completing a full electrical cycle during which the capacitive coupling of the induced segment K underwent a complete alternation of its capacitive coupling with the inducing segments S, T. This cycle repeats itself during each 180 electrical degrees of rotation for each of the two induced segments of opposite polarity so that each time one inducing segment has a maximum capacitive coupling with a positive inducing segment, the other induced segment has a maximum capacitive coupling with a negative inducing segment.

The effect of these alternations of the capacitive coupling of the induced segments of opposite polarity with the inducing segments of opposite polarity, may be represented by a capacity-time curve similar to Fig. 2, in which the capacitive coupling of the induced segments goes through a complete alternation during 180 electrical degrees of the mechanical rotation. These capacitive coupling alternations reach a maximum capacity $C_0$ given by the capacity between an induced segment and an inducing segment when a coupling vane is in a position of maximum coupling.

In accordance with the invention the capacitive coupling alternations of a rotary condenser apparatus of the type shown in Fig. 11, is utilized for producing in an output circuit connected to the induced segments of opposite polarity a large current by providing the output circuit with an inductance having a value at which its reactive impedance is equal to the effective capacitive impedance of the inducing and induced segment in the position of maximum capacitive coupling between the segments at the fundamental frequency of the charge alternations or its harmonics; and the required inductance is held down to a low value by making the frequency of the charge alternations large through angular subdivision of the condenser segments and by stacking a multiplicity of such angularly subdivided segment units to form a large effective capacity.

Accordingly, the condenser apparatus arranged in the way shown in Fig. 11 will lend itself for producing a large measuring current for operating a reliable measuring instrument in a way similar to the rotary condenser described in Figs. 1 to 10. As in the prior construction, the inducing segments S, T, are made in the form of annular discs subdivided by small gaps so that each disc is formed by a large number of adjacent segments of opposite polarity that are insulated from each other. As distinguished from the rotary condenser described in the prior figures, the induced segments K, N, are made of discs exactly like the inducing discs S, T, subdivided by small gaps into the same number of annular segments displaced by half an angular width of a segment relative to the inducing segment in the way shown diagrammatically in Fig. 11.

The alternate inducing segments of one polarity are interconnected and form one input terminal to the condenser and similarly the alternate segments of the opposite polarity are interconnected and form the other input terminal to the condenser. In a similar way alternate induced segments of opposite polarity are interconnected to common terminals of opposite polarity which are in turn connected to the meter 151.

In order to secure a large effective capacity with such multiple segment disc arrangement, sets of alternate induced and inducing sets are assembled side by side as in a conventional condenser, with the induced segments displaced against the inducing segments by one-half of an angular width of a segment. Such stator stacks made up from alternate segment sections of inducing $S_1 T_1 S_2 T_2 \ldots S_n T_n$ and sections of induced segments $K_1 N_1 K_2 N_2 \ldots K_n S_n$ shown in perspective in Fig. 15 may be assembled into a stator shown in the developed view of Fig. 14 similar in general construction to that shown in Figs. 5, 6 and 8, except that the disc elements $K_1 N_1 \ldots K_n S_n$ of the induced segment sections are staggered axially against the inducing disc elements $S_1 T_1 \ldots S_n T_n$ so as to form a stack of alternating induced and inducing segment discs separated by gaps through which the rotor vanes rotate.

The rotor with insulated vane sections $U_1 X_1 V_1 Y_1 \ldots U_n X_n V_n Y_n$ for cooperating with such stator may be constructed with vane sections shown in Fig. 16, in a way similar to the rotor sections shown in Fig. 4a, the width of each section being half the width of a stator section, with the segment elements of adjacent sections aligned to form discs which rotate through gaps between the inducing and induced segments of the stator. One set of alternate vane sections $X_1 Y_1 \ldots X_n Y_n$ are metallically interconnected to form a set of shielding vanes, and each of the remaining vane sections $U_1 V_1 \ldots U_n V_n$ is insulatingly mounted on the rotor and acts as a set of coupling vanes in the way described above.

Fig. 12 shows diagrammatically a measuring system of the invention utilizing such rotary condenser with stationary induced and inducing segments with interleaved rotary coupling and shielding vanes of the type shown in Fig. 11, subdivided into a plurality of annular segments to increase the frequency alternations of the measuring current. The stator is provided with discs formed of alike inducing segments $S_1$, $T_1$, $S_2$, $T_2$ of alternate polarity which constitute annular discs subdivided by small gaps so that adjacent segments of opposite polarity are insulated from each other. The segments $S_1$, $S_2$ of one polarity are interconnected by a conductor 160 which is connected to an input terminal 162, and the segments $T_1$, $T_2$ of opposite polarity are similarly interconnected by a conductor 163, connected to an input terminal 164. A resistor 135 connected in series with one of the input terminals and a condenser 134 connected in parallel to the inducing segments of opposite polarity, constitute a filter which suppresses flow of current between the source of potential to be measured, such as the pyrometer thermocouple 131 and the input terminals.

Each stationary disc of inducing segments $S_1$, $T_1$, $S_2$, $T_2$, cooperates with a similar stationary disc of induced segments of opposite polarity $K_1$, $N_1$, $K_2$, $N_2$, spaced by gaps from the adjacent discs of inducing segments, the induced segments being staggered in quadrature relation with respect to the corresponding sets of inducing segments. The induced segments $K_1$, $K_2$ of one polarity are interconnected by a conductor 165, and the induced segments $N_1$, $N_2$ of opposite polarity are interconnected by a conductor 166, which conductors are in turn connected to an output circuit 168 including an inductance 169 and actuating windings of a measuring instrument which is to measure the potential of the pyrometer thermocouple 131.

The stator discs cooperate with similar rotor discs formed of vanes $U_1$, $X_1$, $V_1$, $Y_1$, $U_2$, $X_2$, $V_2$, $Y_2$ having half the angular width of the segments forming the stator discs $S_1$, $T_1$, $K_1$, $N_1$, $S_2$, $T_2$, $K_2$, $N_2$ and arranged to be rotated at a constant speed by a constant speed motor 170 through a shaft 171. The vanes $X_1$, $Y_1$, $X_2$, $Y_2$ are interconnected by a conductor 173 and act as shielding vanes while the vanes $U_1$, $V_1$, $U_2$, $V_2$ are insulated from each other and from the rotor and act as coupling vanes during the rotation of the shaft 171. With such arrangement using a large number of segments per each stator disc and twice as many vanes per rotor disc, and combining a rotary condenser formed of such stacks of stator and rotor discs with a meter circuit in the way described above, a large current sufficient for operating a standard reliable panel type meter may be obtained.

Either type of the condenser apparatus described above may be used with the different meter circuit combinations explained in connection with Figs. 1, 3 and 10, as well as with other types of measuring instruments, such as dynamometer instruments of the type shown in Fig. 12.

In measuring systems of the invention in which a rotary condenser is combined with a dynamometer instrument, as shown in Fig. 11, the use of a standard cell 132 in series with a thermocouple 131, or other small voltage source to be measured, is of a particular advantage. This is due to the fact that a dynamometer instrument develops a torque proportional to the square of the meter current, and by the use of a standard cell 132, which has, for instance, 10 times the voltage of the thermocouple 131, the rotary condenser will deliver to the meter a current 11 times larger than the meter would receive without the standard cell. Accordingly, the meter will develop a torque 121 times larger than it could develop without the standard cell. The full scale of the instrument for indicating the unknown voltage to be measured is utilized by giving the spring of the meter movement an initial tension equal and opposite to the torque produced by the current obtained by the action of the standard cell. As a result, the full deflection of the instrument is utilized to indicate the thermocouple voltage, and a torque equal to the difference between the square of the current due to the sum of the voltages of the couple and standard cell, and the square of the current due to the voltage of the standard cell alone, is available for operating the instrument over its useful scale.

The sensitivity of the rotary condensers working in conjunction with indicating and recording instruments may be greatly increased by using an auxiliary generator mounted on the same shaft as the rotor and delivering a current correlated to the measuring current produced by the capacity alterations of the rotary condenser. Fig. 12 is a diagrammatic illustration of such meter system.

In accordance with the invention, the motor which drives the dynamic condenser is utilized to drive an auxiliary current generator 180 which supplies an independent current of the same frequency as the current produced by the rotary condenser. The auxiliary generator 180 has a stator with salient poles 181 cooperating with a salient pole rotor 182 driven by the shaft in synchronism with the rotor of the rotary condenser. The salient poles are suitably excited to produce a constant flux through the air gap between the rotor and the stator poles, for instance, by making the stator in the form of a permanently magnetized ring 183, which carries the pole pieces 181. The stator poles 181 of the auxiliary generator are provided with output windings 184 which are connected through a rheostat 185 to serially connected coils 190 which, together with the coils 170 connected to the induced condenser segments form a dynamometer measuring instrument, such as a Kelvin balance. The generator 180 is designed to generate by the flux alternations produced by the rotation of its rotor 182, an alternating current of the same frequency as the alternating currents produced by the charges induced on the condenser segments K₁, N₁, K₂, N₂, by the rotation of the condenser rotor segments U₁, X₁, V₁, Y₁, U₂, X₂, V₂, Y₂, so that the two currents flowing through the sets of coils 170 and 190 of the dynamometer exert a torque which is a measure of the voltage applied by the thermocouple 131 to the inducing segments S₁, T₁ . . . . etc., of the condenser. In order to bring the current from the auxiliary generator in phase with the current from the dynamic condenser and thus obtain a maximum meter torque, the phase of the auxiliary current may be suitably adjusted, for instance, by an angular screw mechanism 189 for adjusting the angular position of the stator poles 181.

Since the meter torque of a dynamometer instrument is proportional to the product of the currents flowing in the two relatively movable coil systems of such instrument, the torque obtained by sending the current from the rotary condenser of Fig. 11 through the serially connected meter coils 149 and 150 is limited by the maximum current obtainable from the rotary condenser, and its deflection follows the square law, giving a non-uniform scale. These limitations are overcome by the system of Fig. 12, in which only one coil system 170 of the dynamometer is supplied by the current from the rotary condenser and the second coil system is supplied with a large constant current supplied by the auxiliary generator 180. With this arrangement the meter sensitivity may be readily made 100 times greater than without the use of the auxiliary generator. In addition, through the supply of a constant current to one coil system of the meter, the torque becomes directly proportional to the magnitude of the dynamic condenser current, giving a uniform meter scale. As a result, the system of Fig. 12 will operate with a sensitivity 100 times larger than a dynamometer having all its actuating coils connected in series with the output circuit of a rotary condenser. In addition, the constant current flow from the auxiliary generator through one set of meter coils makes the meter torque depend only on the magnitude of the measuring alternating currents supplied by the induced condenser segments in accordance with the potential of the voltage source connected to the inducing segments, making it possible to obtain a uniform meter scale.

As shown in Fig. 12, the meter movement consisting of the stationary coils 190 and the movable coils 170 may be used for recording the instantaneous magnitude of the measured voltage. To this end the moving coils 170 are mounted on a support 194 connected through a spring 193 to a movable arm 195 which is provided with a threaded nut 196, mounted on a screw 197, driven by a reversible motor 198 that is energized from a supply source 199 by means of a contact member 200, carried by the movable element 194 of the meter for engaging alternately one of the oppositely lying stationary contacts 201. When one of the stationary contacts 201 is engaged, the motor moves the nut 196 and with it the arm 195 to the right or to the left, increasing or decreasing the tension of the spring 193 until it balances the torque exercised by the moving coils 170 and returns the support 194 to its neutral position shown in Fig. 12, where the contact 200 is free from engagement with the stationary contacts and the motor 198 remains deenergized. As soon as an increase in the current through the meter coils 170 increases the torque above the spring tension, one of the stationary contacts will be engaged by the movable contact 200 and start the worm motor 198 until the spring tension is increased to balance the increased torque acting on the moving coils 170 and returning the moving coil to its neutral position, where the motor circuit is broken.

The advantages accruing from an auxiliary generator for increasing the sensitivity of the measuring instrument and its application for operating recording instruments, as explained in connection with Fig. 12, are not limited to the specific construction and arrangement of the electrodynamic condenser explained in connection with Fig. 12, but may be utilized in the other measuring systems described in connection with Figs. 1, 2 and 11.

The measuring system of the invention is of particular importance in X-ray therapy where the exact and reliable measurement of the instantaneous X-ray intensity as well as of the total dose of the X-ray radiation applied to a patient are necessary in order to prevent fatal damage and injury to the patient. Since many X-ray treatments require relatively large X-ray doses and a small over-dose may be harmful, the lack of reliable instruments for determining the X-ray intensity and the total dosage of the X-ray radiation applied to the patient have hindered the widespread use of X-ray therapy. By the use of the meter system of the invention, the instantaneous X-ray radiation applied to the patient may be measured with a standard reliable panel type meter and the total X-ray radiation applied to the patient may be recorded with a standard watthour meter of reliable and proven construction so that the person giving the treatment is at all times sure that the patient is not endangered by the treatment. A measuring system of the invention suitable for use in X-ray therapy is shown diagrammatically in Fig. 13.

In order to produce a direct indication of the X-ray intensity to which a patient is exposed, the X-ray intensity is measured by an ionization action of the X-rays is measured by an ionization chamber 202 of special design which eliminates measurement errors due to surface leakage. Such ionization chamber 202 which may be placed in the path of the X-rays, indicated by the arrows 203, directly above the body of the patient, comprises two circular electrode sheets 205 of aluminium or similar metal enclosing an inner space 206 into which extends an inner electrode sheet 207 of similar material and of opposite polarity. Three grooved insulating posts 208 locked in place at three peripherally displaced points of the chamber serve as insulating spacers between the inner electrode sheet 207 which fits into central grooves 209 of the posts and the outer electrode sheets 205, which are clamped against the outer ends of the spacer posts, suitably clamped to the annular wall 211 of the chamber. To increase the leakage path between the inner electrode 207 and the outer electrode 205 of the chamber, the three supporting posts are provided with additional grooves 212.

The inner electrode 207 and the outer electrode 205 are connected to a special conductor cable 215 leading to an external supply circuit. The cable consists of an outer conductor 217 which acts as a shield for the inner conductor 216 from which it is spaced by a concentric insulating layer 218, the exterior concentric conductor 217 being likewise insulated by an outer insulating cover 219.

Positive detachable terminal connections are made between the inner and outer cable conductors to the inner and outer chamber electrodes 207 and 205. The end of the cable has the outer insulating cover 219 peeled off for a portion of its length to expose an end portion of the outer conductor 217 over which is slipped a bushing 222 having a threaded outer surface fitting into a threaded opening within the cylindrical side wall 211 of the chamber housing.

The bushing 222 is locked against longitudinal movement by a ring 223 which is clamped or soldered to the end of the outer concentric conductor 217 so that when the bushing 222 is screwed in place, the inner bushing end presses the end of the ring against the rear side of a perforated contact strip 225 mounted over the inner opening of the chamber wall and held clamped at its ends 227 under the edges of the outer electrode plates 205 of the chamber. Thus a positive terminal conducting connection is established between the outer concentric cable conductor 217 and the outer chamber electrodes 205. The inner cable conductor 216 with its rubber coating projects for a distance in front of the end of the outer concentric conductor and has a projecting terminal end member 228 which fits into and detachably engages a terminal sleeve 229 formed in the adjacent edge portion of the inner chamber electrode 207. In this way positive detachable connections are made between the concentric conductors of the insulated connecting cable 215 with the enclosed insulated electrodes 207 and 205 of the ionization chamber while eliminating leakage sources between the chamber electrodes and the cable conductors and safeguarding against leakage errors.

In order to produce an ionization current through the ionization chamber 202 for measuring the intensity of the X-rays passing through the chamber, the ends of the cable conductors 216 and 217 are connected in series with a resistor 231 across the terminals 232 of a constant direct current source. The direct current source may be formed by two leads 233 from a source of 110 A. C. voltage, connected through rectifiers 234 to two voltage doubling condensers 235, which are in turn connected through a filter circuit to the circuit including the ionization chamber and the resistor 231.

The filter circuit may consist of an inductance 236 and a resistor 237 connected in the positive lead from the rectifiers and a filter condenser 238 and two serially connected glow discharge tubes 239 connected between the two leads from the rectifiers. The glow tubes connected across the input terminals 232 of the ionization chamber circuit act as a reliable voltage regulator and maintain a constant voltage. Normally no current flows through the ionization chamber but passage of X-rays through the ionization chamber ionizes the air in the interior of the chamber and produces under the action of the voltage across the chamber electrodes 207 and 205 a discharge current which flows from the supply terminals 232 through the series resistor 231 and produces across the resistor 231 a voltage drop proportional to the current through the ionization chamber and is a direct measure of the intensity of the X-rays passing through the ionization chamber. Since the current through the ionization chamber is very small, being of the order of one-tenth of a microampere, it cannot be measured with any standard instrument and only very special highly sensitive and delicate laboratory instruments had to be used heretofore for measuring the X-rays by this direct method.

Instead of using sensitive laboratory instruments, which are difficult to read, for measuring the small current through the ionization chamber, I employ the rotary condenser system of the invention for operating either a standard reliable panel type meter 250 for indicating the instantaneous X-ray intensity, or a standard reliable watthour meter instrument 251, for integrating the continuous measurement of the intensity of the X-rays passing through the ionization chamber and producing an integrated record of the total X-ray dosage applied to the patient or for simultaneously operating the standard indicating instrument 250 as well as the integrating watthour meter instrument 251.

The watthour meter 251 is of the standard well known construction comprising a disc 252 driven by two driving magnets 253 and 254 against the opposing action of a drag magnet 249 to drive through a suitable gear reduction 255 and worm drives 256, a shaft 257, which in turn drives through friction coupling spring 259 a dial disc 258 which may be rotated by the knob 260 relatively to a fixed pointer provided on the wall 261 above the disc. At one point of the periphery of the disc 258 is provided a cam nose 263 so that after predetermined rotation of the disc it engages a spring contact 264 which completes a circuit to a relay mechanism 265 which controls the operation of the X-ray tube and cuts off the X-ray radiation or actuates an alarm or a control device when the contact switch 264 is closed after a predetermined rotation of the dial disc 258.

The watthour meter 251 is driven in accordance with the X-ray radiation traversing the ionization chamber by energizing its driving magnets 253 and 254 by means of a rotary condenser apparatus 270 provided with an auxiliary alternating current generator 271 driven at a constant speed by motor 272, in the way described above, to supply to the driving magnets 253 and 254 driving energy proportional to the instantaneous X-ray intensity in the ionization chamber.

The rotary condenser 270 has its segments of opposite polarity of $S_1$ $S_2$ ... and $T_1$ $T_2$ connected through leads 275, 276 to the opposite ends of the resistor 231, which is serially connected in the circuit through the ionization chamber so as to apply to the stator segments of opposite polarity a potential difference proportional to the voltage drop across the resistor 231 and thus induce in the rotor segments $K_1$ $K_2$ $N_1$ $N_2$ of opposite polarity alternating charges of high frequency. These charges are supplied through a tuned rotor circuit connected to the induced rotor segments $K_1$ $K_2$ $N_1$ $N_2$ through slip rings 277, 278 and brushes leading to an output circuit 279 including an inductance 280 and a coil 281 which energizes the driving magnet 253 of the watthour meter. The auxiliary generator 271 generates in its windings 285 which are connected to the winding 288 of the other driving magnet 254 of the watthour meter, a constant alternating current which is adjusted in magnitude by a rheostat 286, and in phase by an angular adjusting mechanism 287 to produce in conjunction with the current flowing through the winding 281 of the other driving magnet a torque driving the watthour meter disc 252 in accordance with the instantaneous magnitude of the voltage across the resistor 231 included in the ionization chamber circuit.

The direct indicating instrument 250 may be a standard reliable direct current panel type instrument and may be used with a full wave rectifier which is supplied from the meter circuit 279 connected to the induced condenser segments through a transformer winding 292 which may be combined with the inductance 280 which serves to tune the meter circuit. Instead of using an instrument 250 for indicating the instantaneous X-ray intensity, the driving disc 252 of the watthour meter may, by itself, be used for operating an indicating mechanism because its instantaneous velocity is proportional to the instantaneous magnitude of the X-ray intensity. To this end a small auxiliary braking magnet 295 is supported by a pivotally mounted pointer arm 296 so as to be dragged along in the direction of the rotation of the disc 252 against the restraining action of a spring 297 and indicate by pointer end 298 instantaneous X-ray intensity on a scale 299.

To secure across the input terminals of the rotary condenser 270 a voltage drop proportional to the action of the X-rays in the ionization chamber, the inner electrode 207, which has the highest insulation against ground, is connected through the inner cable conductor 216, which has the highest insulation against ground to the terminal of the resistor 231, which is connected to the ungrounded input segments of the rotary condenser; and the outer chamber electrodes 205, which are less insulated, are connected through the outer cable conductor 217 to the high potential terminal of the D. C. supply source connected to the system terminals 232, 232. As a result, any spurious currents that may be caused by the high voltage potential of the D. C. supply source will flow through a path shunting the entire circuit leading from the terminals 232 through the ionization chamber and the resistor 231. Such spurious current cannot, therefore, affect the voltage drop across the resistor 231, which is solely determined by the X-ray intensity.

By departing from the common practice and using the ionization chamber with the outer electrode of less insulation connected to the high voltage terminal of the supply source, and with the inner highly insulated electrode connected to a point of the meter circuit having a lower potential, the effective part of the circuit through the ionization chamber is protected against leakage currents. As a result, leakage currents produced by the voltage applied to the outer cable conductor of the ionization chamber and to the outer electrodes 205 of the ionization chamber cannot affect the magnitude of the current through the resistor 231, which controls the operation of the rotary condenser, and the current through the ionization chamber gives a reliable indication of the X-ray intensity.

The systems of the measuring X-ray radiation described in connection with Fig. 13 translates by direct action the X-ray intensity to which the patient is subjected into a continuous exact meter current sufficient to operate a standard reliable panel type indicating or standard integrating watthour meter, or both.

By the use of an ionization chamber and supply circuit of special design, the effect of spurious leakage current is eliminated and the ionization current through the chamber is determined solely by the action of the X-rays passing through the chamber. By the positive action of the rotary condenser, which operates on the principle of the accurate quadrant electrometer, the feeble ionization current through the ionization chamber is translated into a substantial current sufficient for operation of standard reliable panel type indicating and recording meters.

The rotary condenser apparatus acts thus as a positive link between the action of the X-rays in the ionization chamber and the standard indicating and recording instruments which are operated by the condenser current under elimination of amplifier tubes and similar devices having variable parameters that affect their operation. Through the positive link secured by the rotary condenser, there is thus obtained an exact meter action which is independent of the characteristics of the X-ray tube and its equipment.

In Fig. 17 is illustrated diagrammatically a rotary condenser measuring arrangement of the type described in connection with Figs. 3 to 8 equipped with a modified form of rectifying commutator unit for rectifying the induced measuring currents generated by the rotary condenser. The actual construction of such commutator unit for a rotary condenser shown in Figs. 5 to 8, is illustrated in Figs. 18 and 19. As shown in Fig. 18, on a shaft extension 300 of the shaft 60 projecting through an opening in the end wall 82 of the rotary condenser, is mounted the commutator unit, generally designated as 301. The commutator unit 301 has a circular supporting plate 302 provided with a bushing 303 which is affixed to the shaft extension 300, for instance, by the threaded engagement at 304. The bushing 303 of the commutator unit is utilized as a support for two slip rings 308, 309 which are connected to the two sets of rotor segments of opposite polarity $K_1$, $K_2 \ldots$, $N_1$, $N_2 \ldots$, respectively. The slip rings 308, 309 are insulated from the bushing and from each other by a sleeve 310 and rings 311, 312 of insulating material, such as hard rubber, the slip rings with the insulating support being held clamped on the bushing by a clamping nut 313 threaded on the bushing 303.

Two insulated leads 315, 316, having their inward ends connected to the conducting plates 68, 70 which form terminal members for the rotor segments of opposite polarity, lead through a bore 317 in the shaft 60 and the shaft extension 300 to provide connections from the rotor segments to the slip rings 308, 309 mounted on the bushing 303. As shown in Fig. 18, the ends of the leads 315, 316 from the rotor segments are connected to conducting rods 321, 322 insulatingly mounted within longitudinal bores 323 of the bushing wall, and studs 324 insulatingly mounted in transverse slots of the bushing wall, and engaging recesses in the inner slip ring surfaces complete the electrical connections to the slip rings 308, 309.

On the outer face of the supporting plate 302 are suitably mounted two sections 331, 332 of a multi-segment commutator arranged in the way shown in Fig. 19. The two commutator sections 331, 332 have interfitting commutator segment extensions 333, 334 corresponding to the successive rotor segments of opposite polarity and arranged to be engaged by brushes 338 for commutating or rectifying the rotor current in the way explained generally in connection with Fig. 3.

The commutator sections 331, 332 are suitably insulated from each other and from the supporting plate 302 by an underlying disc 335 of insulating material, such as hard rubber, and similar insulating strips 337 interposed between the interfitting edges of the commutator segments 333, 334. Aligned for engagement with the commutating segments 333, 334 is one or more commutating brushes 338 so that when the commutator disc 302 is rotated, the commutating brushes 338 alternately come into engagement with the commutator segments 333, 334 of opposite polarity to rectify the current.

In order to increase the output and reduce to a minimum the period during which the rotary condenser segments of opposite polarity are short-circuited by a commutating brush 338, spacer segments 340 are interposed between adjacent commutator segments 333, 334 of opposite polarity along the path engaged by the commutating brush during the rotation of the commutator in the way shown in Fig. 19. The spacer segments 340 are insulated from the adjacent commutator segments 333, 334 and occupy a width slightly smaller than the width of the commutating brush 338 so that as the commutating segments 333, 334 move past the surface of the commutating brush, one edge of the brush is just leaving one of the commutating segments while the other edge of the brush just enters the next following commutator segment. As a result, the commutation period is reduced to a minimum without completely breaking the circuit connection between the commutating brushes and at least one of the commutator segments. The spacer segments 340 are suitably secured to the supporting plate 302 of the commutator unit and may be either insulated or have a direct conducting connection to the supporting plate 302.

As shown in Figs. 18 and 19, the commutator unit 301 with its slip rings 308, 309 and its commutating sections 331, 332 are enclosed in a housing 344 which serves as a brush support. The housing 344 is mounted for adjustable rotational movement relatively to the rotary condenser so as to permit adjustment of the phase relation of the brushes relatively to the condenser segments. The slip rings 308, 309 are engaged by brushes 41 insulatedly housed in brush cartridges 345 radially mounted on the cylindrical part of the brush housing 344. The brushes 41 which engage the slip ring portions of the commutator sections 331, 332 and the commutating brushes 338 which engage the commutating sections 333, 334 are similarly insulatingly mounted in brush cartridges 46 provided in the plate 347 forming an end wall of the commutator housing 344.

By providing the commutator with the insulated spacer segment 340, the period during which adjacent condenser sections are short-circuited is materially reduced. Although such spacers can be made of insulating material, the use of metallic spacers is of a great advantage in such commutating arrangement because it assures uniform wear along the surface engaged by the commutating brushes. The type of commutator arrangement shown in Fig. 18, although composed only of two commutator sections is important in a rotary condenser arrangement of the invention because it acts effectively as a commutator consisting of two segments rotating at full synchronous speed of 36,000 revolutions per minute, although it actually rotates only at 3,600 revolutions per minute.

The material of the commutator segments and of the brushes should be so chosen as to avoid the introduction of contact electromotive forces and thermal electromotive forces into the meter circuit.

The provision of a combined slip ring and current rectifying unit described above makes it possible to keep out of the space within rotary condenser the dust produced incident the slippage of the brushes on the slip rings which complete the connections of the meter circuit to the condenser segments, because the slip rings and the commutator are entirely segregated from the housing enclosing the rotary condenser. Such commutator and slip ring unit may be ventilated, for instance, by providing the lock nut 313 with fan blades and arranging vent holes in the housing 344 and the housing cover 347 so that a stream of air keeps the interior clean of dust and also cools it.

The effectiveness of the commutator arrangement of the type described above may be further improved by arranging the connections of the measuring instrument to the rotor circuit so as to carry on the commutating or rectifying action by a single brush only, or by a plurality of brushes of the same polarity in the way shown in Fig. 17. To this end, the secondary winding 45 of the coupling transformer is provided with a mid-tap 350 which is directly connected as by a lead 351 to one end of the actuating winding 26 of the measuring instrument 27. The other end of the actuating winding 26 is connected to one or more commutating brushes 338 of the same polarity. By supplying the measuring instrument through a matching transformer having a secondary winding with a mid-tap connected to one end of the actuating winding of the D. C. measuring instrument, communication is thus confined only to one or more brushes of the same polarity and the rectification problem is simplified. This arrangement makes it also possible to ground the spacer segment 340 and the commutating brushes 338, for instance, by the ground indicated at 352.

The use of two or more brushes for single pole commutation in the way described above reduces the contact resistance at the commutator segments and thus increases the effective measuring current. In addition, such arrangement also compensates for the slight irregularities at the contact surface when a brush moves from one segment to the other.

In Fig. 17, there is also shown a D. C. recording measuring instrument 360 which enables integration of the measurements made by the rotary condenser measuring arrangement without resort to an auxiliary generator of the type shown in Figs. 12 and 13. As shown diagrammatically in Fig. 17, the recording instrument 360 comprises a two pole permanent magnet 361 with two pole pieces 362 and a magnetic bridging core 363 arranged to provide an annular gap space in which is rotatably mounted a rotary measuring element winding 365. The windings 365 may be formed, for instance, of eight coils connected to segments of a commutator 366 engaged by brushes 367, which may be connected in parallel to the indicating instrument and are supplied with the rectified D. C. measuring current generated by the rotary condenser apparatus. The rotary element winding 365 may be utilized to drive a suitable gearing of a register mechanism 367' which may have a rotary dial which after a certain rotation completes, at contacts 368, 369, an alarm or a control circuit which, for instance, cuts off the power supply to the X-ray machine. The rotary element winding 365 of the register device is so designed and proportioned that the voltage drop across the windings 365 is negligible compared to the counter-electromotive force induced in the rotating winding 365 by the permanent flux of the magnet 361. Such instrument will thus operate in such manner as to actuate the rotary element winding 365 to move with a velocity proportional to the voltage output of the rotary condenser, and serve to measure and integrate the D. C. potential across the input terminals of the condenser apparatus.

Instead of using a commutator-type rectifier of the type illustrated in connection with Figs. 17 to 19, a vibrator-type rectifier of the type shown in Fig. 20 may be utilized for rectifying the current supplied by the rotary condenser to the instrument 27. As shown diagrammatically in Fig. 20, the vibrator mechanism may have a rocker member 370 which cooperates with a cam member 371 driven by the shaft 15 of the rotary condenser so that in the course of rotation of the shaft, the rocker member 370 is actuated to alternately complete the circuit at the contacts 372, 373 and deliver rectified current to the instrument 27. In order to reduce to minimum the energy required to actuate the vibratory rocker arm, it may be combined with a ball-bearing structure 374 which converts the rotary movement of the driving shaft into a vibratory movement of the rocker arm.

A rotary condenser measuring arrangement of the invention, which proved successful in actual operation, is constructed and designed in accordance with the following data:

The inducing and induced condenser sections of the rotary condenser have in the position of maximum capacitive coupling a capacity of $2 \times 10^{-9}$ farad, and are actuated to generate voltage alternations at the rate of 600 cycles per second. The output circuit connected to the induced condenser segments is designed with a Q of about 60 and actuates the measuring instrument through a matching transformer giving for the overall meter circuit a resultant Q of about 30. The leakage resistance between the inducing segments of opposite polarity is about $10^{10}$ ohms, and the leakage resistance across the induced condenser sections is about $10^8$ ohms. The input circuit elements to the induced condenser have a shunting capacity of about ten times the maximum capacity between the inducing and induced condenser sections, and the input circuit elements include a series resistance of about $10^{11}$ ohms.

Depending on the requirements, the design of practical rotary condenser measuring arrangements of the invention may depart from the foregoing data. Thus, a practical rotary condenser measuring arrangement of the invention may be designed to have inducing and induced condenser sections which, in the position of maximum capacitive coupling, have a capacity of the order of $2 \times 10^{-12}$ farad, or more; to operate so as to generate voltage alternations of a frequency of about 200 cycles per second, or more; to have an output measuring circuit with an overall Q of 20, or more; to have a leakage resistance between the inducing condenser sections of opposite polarity of about $10^8$ ohms, or more; to have a shunting capacity in parallel to the inducing condenser sections of opposite polarity of about four or more times the maximum capacity between the inducing and induced condenser sections; and to have a series resistance in the input circuit to the inducing condenser sections of several megohms or more.

It is accordingly desired that the appended claims be given a broad construction commensurate with the scope of the invention within the art.

I claim:

1. In an arrangement for measuring a difference of potential between two points of different potential, a condenser apparatus comprising an inducing member having two sections of condenser sheets of opposite polarity, input circuit elements for connecting the two inducing sections to the points of different potential, an induced member having two sections of condenser sheets of opposite polarity capacitively coupled to said inducing condenser sheets, and means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations or at one of its harmonic frequencies an inductive impedance of the order of the capacitive impedance formed by the inducing and induced condenser sections while aligned in a position of maximum capacitive coupling, said input circuit elements including means for suppressing flow of energy between said condenser sections and said points of opposite potential during the operation of said condenser apparatus.

2. In an arrangement for measuring a difference of potential between two points of different potential, a rotary condenser apparatus comprising an inducing member having two sections of condenser sheets of opposite polarity, input circuit elements for connecting the two inducing sections to the points of different potential, an induced member having two sections of condenser sheets of opposite polarity capacitively coupled to said inducing condenser sheets, and rotary means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations an inductive impedance of the order of the capacitive impedance formed by the inducing and induced condenser sections while aligned in a position of maximum capacity, said input circuit elements including means for suppressing flow of energy between said condenser sections and said points of opposite potential during the operation of said rotary condenser apparatus.

3. In an arrangement for measuring a difference of potential between two points of different potential, a rotary condenser apparatus comprising an inducing member having two sections of condenser sheets of opposite polarity, input circuit elements for connecting the two inducing sections to the points of different potential, an induced member having two sections of condenser sheets of opposite polarity capacitively coupled to said inducing condenser sheets, and means for producing periodical substantially constant frequency variations of the capacitive coupling between the inducing and induced condenser sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations or at one of its harmonic frequencies an inductive impedance of the order of the capacitive impedance formed by the inducing and induced condenser sections while aligned in a position of maximum capacity, said input circuit elements including a shunting capacity connected parallel to the inducing sections that has at least three times the maximum capacity between the inducing and the induced condenser sections.

4. In an arrangement for measuring a difference of potential between two points of different potential, a rotary condenser apparatus comprising an inducing member having two sections of condenser sheets of opposite polarity, input circuit elements for connecting the two inducing sections to the points of different potential, an induced member having two sections of condenser sheets of opposite polarity capacitively coupled to said inducing condenser sheets, and rotary means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations an inductive impedance of the order of the capacitive impedance formed by the inducing and induced condenser sections while aligned in a position of maximum capacity, said input circuit elements including a shunting capacity connected parallel to the inducing sections that has at least three times the maximum capacity between the inducing and the induced condenser sections.

5. In an arrangement for measuring a difference of potential, a rotary condenser apparatus comprising an inducing member having two sections of condenser sheets of opposite polarity, an electric energy source having a relatively high potential terminal and a relatively lower potential terminal, an impedance element having a point of relatively low potential connected to the low potential terminal of said source, a space discharge device having a highly insulated electrode and a relatively less insulated electrode, a connecting cable having a highly insulated lead connecting a relatively high potential point of the impedance element to the highly insulated electrode of the discharge device, and a relatively lower insulated lead connecting the high potential terminal of the energy source to the less insulated electrode of the discharge device, said impedance element having a relatively low potential terminal connected to the low potential terminal of the energy source, input circuit elements for connecting the two inducing sections to points of different potential on said impedance element, an induced member having two sections of condenser sheets of opposite polarity capacitively coupled to said inducing condenser sheets, and means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations or at one of its harmonic frequencies an inductive impedance of the order of the capacitive impedance formed by the inducing and induced condenser sections while aligned in a position of maximum capacity, said input circuit elements including means for suppressing flow of energy between said condenser sections and said points of opposite potential during the operation of said rotary condenser apparatus.

6. In an arrangement for measuring a difference of potential, a rotary condenser apparatus comprising an inducing member having two sections of condenser sheets of opposite polarity, an electric energy source having a relatively high potential terminal and a relatively lower potential terminal, an impedance element having a point of relatively low potential connected to the low potential terminal of said source, a space discharge device having a highly insulated electrode and a relatively less insulated electrode, a connecting cable having a highly insulated lead connecting a relatively high potential point of the impedance element to the highly insulated electrode of the discharge device, and a relatively lower insulated lead connecting the high potential terminal of the energy source to the less insulated electrode of the discharge device, said impedance element having a relatively low potential terminal connected to the low potential terminal of the energy source, input circuit elements for connecting the two inducing sections to points of different potential on said impedance element, an induced member having two sections of condenser sheets of opposite polarity capacitively coupled to said inducing condenser sheets, and means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations or at one of its harmonic frequencies an inductive impedance of the order of the capacitive impedance formed by the inducing and induced condenser sections while aligned in a position of maximum capacity, said input circuit elements including a shunting capacity connected parallel to the inducing sections that has at least three times the maximum capacity between the inducing and the induced condenser sections.

7. In an arrangement for measuring a difference of potential, a rotary condenser apparatus comprising an inducing member having two sections of condenser sheets of opposite polarity, an electric energy source having a relatively high potential terminal and a relatively lower potential terminal, an impedance element having a point of relatively low potential connected to the low potential terminal of said source, a space discharge device having a highly insulated electrode and a relatively less insulated electrode, a connecting cable having a highly insulated lead connecting a relatively high potential point of the impedance element to the highly insulated electrode of the discharge device, and a relatively lower insulated lead connecting the high potential terminal of the energy source to the less insulated electrode of the discharge device, said impedance element having a relatively low potential terminal connected to the low potential terminal of the energy source, input circuit elements for connecting the two inducing sections to points of different potential on said impedance element, an induced member having two sections of condenser sheets of opposite polarity capacitively coupled to said inducing condenser sheets, and rotary means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations an inductive impedance of the order of the capacitive impedance formed by the inducing and induced condenser sections while aligned in a position of maximum capacity, said input circuit elements including a shunting capacity connected parallel to the inducing sections that has at least three times the maximum capacity between the inducing and the induced condenser sections.

8. In an arrangement for measuring a difference of potential between two points of different potential, a rotary condenser apparatus comprising an inducing member having two sections of condenser sheets of opposite polarity, input circuit elements for connecting the two inducing sections to the points of different potential, an induced member having two sections of condenser sheets of opposite polarity capacitively coupled to said inducing condenser sheets, and rotary means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations an inductive impedance of the order of the capacitive impedance formed by the inducing and induced condenser sections while aligned in a position of maximum capacity, said input circuit elements including means for suppressing flow of energy between said condenser sections and said points of opposite potential during the operation of said rotary condenser apparatus, supplemental means synchronized with said rotary means for supplying a supplemental current correlated to the generated voltage alternations, said measuring means being jointly energized by the energy of said induced condenser sections and said supplemental means for producing a measuring motion correlated in a predetermined manner to the potential difference applied to said input circuit elements.

9. In an arrangement for measuring a difference of potential between two points of different potential, a rotary condenser apparatus comprising an inducing member having two sections of condenser sheets of opposite polarity, input circuit elements for connecting the two inducing sections to the points of different potential, an induced member having two sections of condenser sheets of opposite polarity capacitively coupled to said inducing condenser sheets, and rotary means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations an inductive impedance of the order of the capacitive impedance formed by the inducing and induced condenser sections while aligned in a position of maximum capacity, said input circuit elements including a shunting capacity connected parallel to the inducing sections that has at least three times the maximum capacity between the inducing and the induced condenser sections, supplemental means synchronized with said rotary means for supplying a supplemental current correlated to the generated voltage alternations, said measuring means being jointly energized by the energy of said induced condenser sections and said supplemental means for producing a measuring motion correlated in a predetermined manner to the potential difference applied to said input circuit elements.

10. A measuring arrangement according to claim 2, characterized by the fact that the input circuit elements include a shunting capacity connected parallel to the inducing sections, that it has at least five times the maximum capacity between the inducing and induced condenser sections, and that an impedance is serially connected in the input circuit elements having a resistance of at least $10^8$ ohms.

11. A measuring arrangement according to claim 2, characterized by the fact that the measuring means have an actuating winding and a transformer connecting the actuating winding to the output circuit portions connected to the induced condenser sections of opposite polarity.

12. A measuring arrangement according to claim 2, characterized by rectifying means connected between the measuring means and the output circuit portions connected to the induced condenser sections of opposite polarity.

13. A measuring arrangement according to claim 2, characterized by the fact that the measuring means have an actuating winding and a transformer connecting said actuating winding to the output circuit portions connected to the induced condenser sections of opposite polarity, and rectifying means connected between the transformer and the actuating winding for rectifying the current supplied to the measuring means.

14. A measuring arrangement according to claim 2, characterized by the fact that the measuring means have an actuating winding and a transformer connecting the actuating winding to the output circuit portions connected to the induced condenser sections of opposite polarity; and that one end of the actuating winding of the measuring means is connected to a ground.

15. A measuring arrangement according to claim 1, characterized by the fact that said inducing and induced condenser sections form parts of at least five discs subdivided into at least six adjacent segments of opposite polarity.

16. A measuring arrangement according to claim 2, characterized by the fact that each of said inducing and induced condenser sections forms a part of at least five discs subdivided into at least twelve adjacent segments of opposite polarity, and that the discs of the inducing condenser sheets and the induced condenser sheets are alternately mounted in side-by-side relation adjacent to each other.

17. A measuring arrangement according to claim 2, characterized by the fact that the inducing and induced condenser sections have in the position of maximum capacitive coupling a capacity of the order of $2 \times 10^{-11}$ farad or more.

18. A measuring arrangement according to claim 2, characterized by the fact that the condenser apparatus is actuated to generate voltage alternations of the order of 200 cycles per second or more.

19. A measuring arrangement according to claim 2, characterized by the fact that the inducing and induced condenser sections have in the position of maximum capacitive coupling a capacity of the order of $2 \times 10^{-10}$ farad or more, and that the condenser apparatus is driven to generate voltage alternations of the order of 400 cycles per second or more.

20. A measuring arrangement according to claim 2, characterized by the fact that the inducing and induced condenser sections have in the position of maximum capacitive coupling a capacity of the order of $2 \times 10^{-9}$ farad or more, and that the condenser apparatus is driven to generate voltage alternations of the order of 600 cycles per second or more.

21. A measuring arrangement according to claim 4, characterized by the fact that the measuring means have an actuating winding and a transformer connecting the actuating winding to the output circuit portions connected to the induced condenser sections of opposite polarity.

22. A measuring arrangement according to claim 4, characterized by rectifying means connected between the measuring means and the output circuit portions connected to the induced condenser sections of opposite polarity.

23. A measuring arrangement according to claim 4, characterized by the fact that the measuring means have an actuating winding and a transformer connecting said actuating winding to the output circuit portions connected to the induced condenser sections of opposite polarity, and rectifying means connected between the transformer and the actuating winding for rectifying the current supplied to the measuring means.

24. A measuring arrangement according to claim 4, characterized by the fact that the measuring means have an actuating winding and a transformer connecting the actuating winding to the output circuit portions connected to the induced condenser sections of opposite polarity; and that one end of the actuating winding of the measuring means is connected to a ground.

25. A measuring arrangement according to claim 4, characterized by the fact that said inducing and induced condenser sections form parts of at least five discs subdivided into at least six adjacent segments of opposite polarity.

26. A measuring arrangement according to claim 4, characterized by the fact that each of said inducing and induced condenser sections forms a part of at least five discs subdivided into at least twelve adjacent segments of opposite polarity; and that the discs of the inducing condenser sheets and the induced condenser sheets are alternately mounted in side-by-side relation adjacent to each other.

27. A measuring arrangement according to claim 4, characterized by the fact that the inducing and induced condenser sections have in the position of maximum capacitive coupling a capacity of the order of $2 \times 10^{-11}$ farad or more.

28. A measuring arrangement according to claim 4, characterized by the fact that the condenser apparatus is actuated to generate voltage alternations of the order of 200 cycles per second or more.

29. A measuring arrangement according to claim 4, characterized by the fact that the inducing and induced condenser sections have in the position of maximum capacitive coupling a capacity of the order of $2 \times 10^{-10}$ farad or more; and that the condenser apparatus is driven to generate voltage alternations of the order of 400 cycles per second or more.

30. A measuring arrangement according to claim 4, characterized by the fact that the inducing and induced condenser sections have in the position of maximum capacitive coupling a capacity of the order of $2 \times 10^{-9}$ farad or more, and that the condenser apparatus is driven to generate voltage alternations of the order of 600 cycles per second or more.

31. A measuring arrangement according to claim 2, characterized by the fact that said inducing and induced condenser sections form parts of at least five discs subdivided into at least six adjacent segments of opposite polarity; and that the measuring means have an actuating winding and a transformer connecting the actuating winding to the output circuit portions connected to the induced condenser sections of opposite polarity.

32. A measuring arrangement according to claim 2, characterized by the fact that said inducing and induced condenser sections form parts of at least five discs subdivided into at least six adjacent segments of opposite polarity; and that the measuring means have an actuating winding and a transformer connecting said actuating winding to the output circuit portions connected to the induced condenser sections of opposite polarity, and rectifying means connected between the transformer and the actuating winding for rectifying the current supplied to the measuring means.

33. A measuring arrangement according to claim 2, characterized by the fact that said inducing and induced condenser sections form parts of at least five discs subdivided into at least six adjacent segments of opposite polarity; that the measuring means have an actuating winding and a transformer connecting the actuating winding to the output circuit portions connected to the induced condenser sections of opposite polarity; and that one end of the actuating winding of the measuring means is connected to a ground.

34. A measuring arrangement according to claim 2, characterized by the fact that the inducing and induced condenser sections have in the position of maximum capacitive coupling a capacity of the order of $2 \times 10^{-10}$ farad or more; that the condenser apparatus is driven to generate voltage alternations of the order of 400 cycles per second or more; and that the measuring means have an actuating winding and a transformer connecting the actuating winding to the output circuit portions connected to the induced condenser sections of opposite polarity.

35. A measuring arrangement according to claim 4, characterized by the fact that the inducing and induced condenser sections have in the position of maximum capacitive coupling a capacity of the order of $2 \times 10^{-10}$ farad or more; that the condenser apparatus is driven to generate voltage alternations of the order of 400 cycles per second or more; and that the measuring means have an actuating winding and a transformer connecting said actuating winding to the output circuit portions connected to the induced condenser sections of opposite polarity, and rectifying means connected between the transformer and the actuating winding for rectifying the current supplied to the measuring means.

36. A measuring arrangement according to claim 2, characterized by the fact that the inducing and induced condenser sections have in the position of maximum capacitive coupling a capacity of the order of $2 \times 10^{-10}$ farad or more; that the condenser apparatus is driven to generate voltage alternations of the order of 400 cycles per second or more; that the measuring means have an actuating winding and a transformer connecting the actuating winding to the output circuit portions connected to the induced condenser sections of opposite polarity; and that one end of the actuating winding of the measuring means is connected to a ground.

37. In an arrangement for measuring a difference of potential between two points of different potential, a rotary condenser apparatus comprising an inducing member having two sections of condenser sheets of opposite polarity, input circuit elements for connecting the two inducing sections to the points of different potential, an induced member having two sections of condenser sheets of opposite polarity capacitively coupled to said inducing condenser sheets, and rotary means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations an inductive impedance of the order of the capacitive impedance formed by the inducing and induced condenser sections while aligned in a position of maximum capacity, said input circuit elements including means for suppressing flow of energy between said condenser sections and said points of opposite potential during the operation of said rotary condenser apparatus, and auxiliary generator means driven substantially in synchronism with said rotary means for generating voltage alternations correlated to the voltage alternations produced by said rotary condenser apparatus, said measuring means having an element supplied by said auxiliary generating means.

38. In an arrangement for measuring a difference of potential between two points of different potential, a rotary condenser apparatus comprising an inducing member having two sections of condenser sheets of opposite polarity, input circuit elements for connecting the two inducing sections to the points of different potential, an induced member having two sections of condenser sheets of opposite polarity capacitively coupled to said inducing condenser sheets, and rotary means for producing periodical substantially constant frequency variations of the capacitive coupling between the inducing and induced sheets so as to generate in the induced condenser sections voltage alternations of relatively high frequency proportional to the potential difference applied to said input circuit elements, in combination with an output circuit connected between the induced condenser sections of opposite polarity including measuring means actuated by energy generated in the induced member, said output circuit including inductive means designed and proportioned to constitute an effective inductance having at the frequency of said alternations an inductive impedance of the order of the capacitive impedance formed by the inducing and induced condenser sections while aligned in a position of maximum capacity, said input circuit elements including a shunting capacity connected parallel to the inducing sections that has at least three times the maximum capacity between the inducing and the induced condenser sections, and auxiliary generator means driven substantially in synchronism with said rotary means for generating voltage alternations correlated to the voltage alternations produced by said rotary condenser apparatus, said measuring means having an element supplied by said auxiliary generating means.

EMIL HENRY GREIBACH.